(12) United States Patent
Xu et al.

(10) Patent No.: US 12,712,673 B2
(45) Date of Patent: Aug. 18, 2026

(54) COMMUNICATION METHOD, ACCESS NETWORK DEVICE, TERMINAL DEVICE, AND CORE NETWORK DEVICE

(71) Applicant: HUAWEI TECHNOLOGIES CO., LTD., Shenzhen (CN)

(72) Inventors: Bin Xu, Beijing (CN); Bingzhao Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 371 days.

(21) Appl. No.: 17/947,651

(22) Filed: Sep. 19, 2022

(65) Prior Publication Data

US 2023/0012998 A1 Jan. 19, 2023

Related U.S. Application Data

(63) Continuation of application No. PCT/CN2021/081772, filed on Mar. 19, 2021.

(30) Foreign Application Priority Data

Mar. 19, 2021 (CN) ........................ 202010203782.4

(51) Int. Cl.
*H04L 1/16* (2023.01)
*H04L 1/1607* (2023.01)
(Continued)

(52) U.S. Cl.
CPC ....... *H04L 1/1642* (2013.01); *H04W 36/0064* (2023.05); *H04W 36/0235* (2023.05); *H04W 76/19* (2018.02); *H04W 36/087* (2023.05)

(58) Field of Classification Search
CPC ........... H04L 1/1642; H04L 2001/0093; H04L 47/34; H04W 36/0064; H04W 36/0235;
(Continued)

(56) References Cited

U.S. PATENT DOCUMENTS 11,122,477 B2 * 9/2021 Zhu ....................... H04W 76/12
2008/0192696 A1 8/2008 Sachs et al.
(Continued)

FOREIGN PATENT DOCUMENTS

CN 107645747 A 1/2018
CN 108924876 A 11/2018
(Continued)

OTHER PUBLICATIONS

Chinese Office Action issued in corresponding Chinese Application No. 202010203782.4, dated Sep. 29, 2023, pp. 1-6.
(Continued)

*Primary Examiner* — Romani Ohri
(74) *Attorney, Agent, or Firm* — HAUPTMAN HAM, LLP

(57) ABSTRACT

A communication method, an access network device, a terminal device, and a core network device where the terminal device is handed over from a first access network device to a second access network device, the second access network device learns of first service progress of the first access network device based on a first sequence number of a data packet forwarded by the first access network device, without introducing additional progress exchange information between the two access network devices.

20 Claims, 9 Drawing Sheets

(51) Int. Cl.

| | |
|---|---|
| ***H04W 36/00*** | (2009.01) |
| ***H04W 36/02*** | (2009.01) |
| ***H04W 76/19*** | (2018.01) |
| *H04W 36/08* | (2009.01) |

(58) Field of Classification Search

CPC ... H04W 36/087; H04W 76/12; H04W 76/19; H04W 76/40

See application file for complete search history.

(56) References Cited

U.S. PATENT DOCUMENTS

| | | | | |
|---|---|---|---|---|
| 2009/0086677 | A1 * | 4/2009 | Ho | H04W 36/02 370/331 |
| 2009/0149189 | A1 | 6/2009 | Sammour et al. | |
| 2017/0289021 | A1 | 10/2017 | Säily et al. | |
| 2019/0268815 | A1 * | 8/2019 | Zhu | H04W 36/0016 |
| 2019/0373672 | A1 | 12/2019 | Kim | |
| 2020/0068639 | A1 | 2/2020 | Kim et al. | |
| 2023/0292200 | A1 * | 9/2023 | Dai | H04W 36/0235 |

FOREIGN PATENT DOCUMENTS

| | | | |
|---|---|---|---|
| CN | 109246770 | A | 1/2019 |
| CN | 110620640 | A | 12/2019 |
| CN | 111866971 | A | 10/2020 |
| JP | 2009296149 | A | 12/2009 |
| JP | 2010511334 | A | 4/2010 |
| JP | 2015041786 | A | 3/2015 |
| WO | 2007111320 | A1 | 10/2007 |
| WO | 2008129812 | A1 | 10/2008 |
| WO | 2016068316 | A1 | 5/2016 |

OTHER PUBLICATIONS

Qualcomm Incorporated et al, "Indication NR is available to use", 3GPP TSG-SA WG2 Meeting #122bis S2-176090, Aug. 25, 2017, total 36 pages.

3GPP TS 36.300 V15.8.0:"rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2(Release 15)",Dec. 2019, total 365 pages.

3GPP 38.415 V16.0.0:"3rd Generation Partnership Project; Technical Specification Group Radio Access Network;NG-RAN;PDU Session User Plane Protocol(Release 16)",Mar. 2020,total 14 pages.

3GPP TS 38.300 V16.0.0 (Dec. 2019), 3rd Generation Partnership Project; Technical Specification Group Radio Access Network; NR; NR and NG-RAN Overall Description; Stage 2(Release 16), 101 pages.

International Search Report issued in corresponding International Application No. PCT/CN2021/081772, dated Jun. 18, 2021, pp. 1-10.

Japanese Office Action issued in corresponding Japanese Application No. 2022-556613, dated Dec. 25, 2023, pp. 1-12.

Vodafone UK: "Transmission Sequence Number Required in MBSC", 3GPP Draft; S2-030616,Mar. 2, 2003, XP050242865, total 3 pages.

Extended European Search Report issued in corresponding European Application No. 21771538.2, dated Jul. 12, 2023, pp. 1-17.

Japanese Office Action issued in corresponding Japanese Application No. 2022-556613, dated Jun. 24, 2024, pp. 1-11.

European Office Action issued in corresponding European Application No. 21771538.2, dated Jun. 18, 2025, pp. 1-14.

Japanese Office Action issued in corresponding Japanese Patent Application No. 2022-556613, mailed on Feb. 17, 2026, pp. 1-21.

* cited by examiner

COMMUNICATION METHOD, ACCESS NETWORK DEVICE, TERMINAL DEVICE, AND CORE NETWORK DEVICE

CROSS-REFERENCE TO RELATED APPLICATIONS

This application is a continuation of International Application No. PCT/CN2021/081772, filed on Mar. 19, 2021, which claims priority to Chinese Patent Application No. 202010203782.4, filed on Mar. 20, 2020. The disclosures of the aforementioned applications are hereby incorporated by reference in their entireties.

BACKGROUND

A multimedia broadcast multicast service (Multimedia Broadcast Multicast Service, MBMS) is a service oriented to a plurality of terminal devices. For example, a live broadcast service and some public safety services each are the MBMS service. In a current communication system, an access network device may send the MBMS service to the terminal device in a unicast transmission mode by establishing a dedicated bearer with the single terminal device, or may send the MBMS service to the terminal devices in a multicast (groupcast) transmission mode by establishing a common bearer with the plurality of terminal devices. Regardless of the unicast transmission mode or the multicast transmission mode, different access network devices separately determine sequence numbers of data packets of MBMS services when sending the data packets of the MBMS services to terminal devices within coverage of the different access network devices.

When moving from a source access network device to a target access network device, to continue to receive an MBMS service, after being handed over to the target access network device, a terminal device needs to continue to receive an MBMS service originally received from the source access network device. However, because progress of MBMS services sent by the two access network devices may be inconsistent, and the source access network device and the target access network device are independent of each other when determining sequence numbers of data packets of the MBMS services, the source access network device and the target access network device may have inconsistent understanding of the sequence numbers of the data packets of the MBMS services in a handover process of the terminal device. Consequently, when the handover occurs, receiving of the MBMS service by the terminal device is interrupted, or the terminal device receives a redundant data packet. Therefore, continuity of the MBMS service cannot be ensured.

SUMMARY

At least one embodiment provides a communication method, an access network device, a terminal device, and a core network device. According to the communication method, a conventional-technology case in which a terminal device receiving an MBMS service receives a redundant data packet or service data is interrupted during handover between access network devices because multicast service progress of the different access network devices is inconsistent.

According to a at least one embodiment, a communication method is provided. The method is applied to a first access network device, and includes:

receiving a first data packet and first indication information from a core network device, where the first indication information indicates a sequence of the first data packet in at least one data packet; determining a first sequence number of a first protocol layer of the first data packet based on the first indication information; and sending the first data packet to a terminal device.

Therefore, in a process in which the terminal device is handed over from the first access network device to a second access network device, the second access network device learns of first service progress of the first access network device based on a sequence number of a data packet forwarded by the first access network device, without introducing additional progress exchange information between the two access network devices.

With reference to at least one embodiment, in some embodiments, the first indication information includes at least one of the following information: a general packet radio service tunneling protocol-user plane GTP-U sequence number and a first service sequence number, where the first service sequence number is set by the core network device or a data server, the first data packet is a data packet of a first service, and the at least one data packet is a data packet of the first service.

In some embodiments, the first protocol layer includes at least one of the following: a service data adaptation protocol SDAP layer, a packet data convergence protocol PDCP layer, and a radio link control layer RLC layer.

In some embodiments, the method further includes: setting a start sequence number of the first protocol layer of the first data packet based on the first indication information in response to any one of establishment of a first protocol entity, re-establishment of the first protocol entity, and recovery of the first protocol entity occurs.

Therefore, in response to any one of the establishment of the first protocol entity, the re-establishment of the first protocol entity, and the recovery of the first protocol entity occurs, the first access network device sets the start sequence number of the first protocol layer of the first data packet based on the first indication information, to ensure continuity of data packets of the first service, and avoid sequence discontinuity that is of the data packets of the first service and that is caused by setting of the start sequence number of the first protocol layer.

In some embodiments, the method further includes: sending second indication information to the terminal device, where the second indication information indicates a sequence number of the $1^{st}$ data packet that is of the first service and that is sent by the first access network device to the terminal device after the first protocol entity is established, the first protocol entity is re-established, or the first protocol entity is recovered.

Therefore, the terminal device determines a start sequence number of a first protocol layer of the $1^{st}$ received data packet based on the second indication information, so that a data packet loss caused by inconsistent determining of the $1^{st}$ data packet by the first terminal device and the first access network device is avoided.

In some embodiments, the method further includes: receiving third indication information from a second access network device, where the third indication information indicates the first access network device to stop forwarding a data packet to the second access network device; and stopping, based on the third indication information, forwarding the data packet to the second access network device.

Therefore, in a handover process of the first terminal device, the second access network device determines whether data forwarding of the first access network device is stopped, and sends the data forwarding stop indication information to the first access network device, so that multicast service receiving continuity of the terminal device in the handover process is ensured, and a packet loss or redundant transmission is avoided.

In some embodiments, the method further includes: receiving fourth indication information sent by the second access network device, where the fourth indication information indicates a sequence number of the $1^{st}$ data packet forwarded by the first access network device to the second access network device; and forwarding a data packet to the second access network device based on the fourth indication information.

The fourth indication information indicates a sequence number of a first protocol layer of the $1^{st}$ data packet that is not received by the first terminal device, namely, a start data packet in data forwarding performed by the first access network device. In this way, the first terminal device can be prevented from receiving a redundant data packet. To be specific, the following case can be avoided: A data packet sent by the first access network device is successfully received by the first terminal device, but is still forwarded by the first access network device to the second access network device, and then sent by the second access network device to the first terminal device.

In some embodiments, the method further includes: receiving fifth indication information sent by a second access network device, where the fifth indication information includes a second sequence number N, and the second sequence number indicates a sequence number of the $1^{st}$ data packet that is of the first service and that is sent by the second access network device to the terminal device after handover of the terminal device is completed. In response to a sequence number that is of a protocol layer and that corresponds to a data packet successfully is sent by the first access network device to the terminal device is N−1, the first access network device stops sending a data packet to the terminal device.

Therefore, in a handover process, the first access network device determines, based on the SN indicated by the second access network device, when to stop a connection to the terminal device, so that multicast service receiving continuity of the terminal device in the handover process is ensured, and a packet loss or redundant transmission is avoided.

In some embodiments, the first access network device sends stop indication information to the second access network device, to indicate the first access network device to disconnect from the first terminal device.

In some embodiments, the second access network device sends fifth indication information to the first access network device, where the fifth indication information includes a second sequence number N−1, and the second sequence number indicates the first access network device to stop, in response to a sequence number of a first protocol layer of a data packet successfully sent by the first access network device to the terminal device is N−1, sending a data packet to the terminal device.

Therefore, the first access network device no longer performs calculation, and directly stops sending the data packet after a data packet whose first sequence number is N−1 is sent.

According to a second aspect, a communication method is provided. The method is applied to a terminal device, and includes: receiving second indication information from a first access network device, where the second indication information indicates a sequence number of the $1^{st}$ data packet that is of a first service and that is sent by the first access network device to the terminal device after a first protocol entity is established, the first protocol entity is re-established, or the first protocol entity is recovered.

With reference to the second aspect, in some embodiments of the another aspect, the method further includes: in response to the first protocol entity is re-established or recovered, sending request information to the first access network device, where the request information requests the first access network device to send the sequence number of the $1^{st}$ data packet that is of the first service and that is sent by the first access network device to the terminal device after the first protocol entity is re-established or the first protocol entity is recovered.

With reference to the second aspect, in some embodiments of the second aspect, the method further includes: sending status report information of a data packet to a second access network device, where the status report information of the data packet indicates, to the second access network device, a data packet successfully received by the terminal device and a data packet unsuccessfully received by the terminal device, where the terminal device is handed over from the first access network device to the second access network device.

According to a third aspect, a communication method is provided. The method is applied to a second access network device, and includes: receiving a first data packet and first indication information from a core network device, where the first indication information indicates a sequence of the first data packet in at least one data packet; determining a second sequence number of a first protocol layer of the first data packet based on the first indication information; and sending the first data packet to a first terminal device.

With reference to the third aspect, in some embodiments of the third aspect, the first indication information includes at least one of the following information: a general packet radio service tunneling protocol-user plane GTP-U sequence number and a first service sequence number, where the first service sequence number is set by the core network device or a data server, the first data packet is a data packet of a first service, and the at least one data packet is a data packet of the first service.

With reference to the third aspect, in some embodiments of the third aspect, the first protocol layer includes at least one of the following:

a service data adaptation protocol SDAP layer, a packet data convergence protocol PDCP layer, and a radio link control layer RLC layer.

With reference to the third aspect, in some embodiments of the third aspect, the method further includes: setting a start sequence number of the first protocol layer of the first data packet based on the first indication information in response to any one of establishment of a first protocol entity, re-establishment of the first protocol entity, and recovery of the first protocol entity occurs.

With reference to the third aspect, in some embodiments of the third aspect, the method further includes: sending second indication information to the terminal device, where the second indication information indicates a sequence number of the $1^{st}$ data packet that is of the first service and that is sent by a first access network device to the terminal device after the first protocol entity is established, the first protocol entity is re-established, or the first protocol entity is recovered.

With reference to the third aspect, in some embodiments of the third aspect, the method further includes: receiving a data packet from a first access network device, where a second terminal device connected to the first access network device is handed over from the first access network device to the second access network device, both the first terminal device and the second terminal device perform the first service, and the data packet sent by the first access network device is a data packet of the first service; and sending third indication information to the first access network device in response to a second sequence number of a first protocol layer of a data packet that is being sent to the first terminal device being greater than or equal to a first sequence number of a first protocol layer of the data packet that is sent by the first access network device, where the third indication information indicates the first access network device to stop forwarding a data packet to the second access network device.

With reference to the third aspect, in some embodiments of the third aspect, the method further includes: receiving status report information of a data packet from the second terminal device, where the status report information of the data packet indicates, to the second access network device, a data packet successfully received by the terminal device and a data packet unsuccessfully received by the terminal device; and sending fourth indication information to the first access network device based on the status report information, where the fourth indication information indicates a sequence number of the $1^{st}$ data packet forwarded by the first access network device to the second access network device.

With reference to the third aspect, in some embodiments of the third aspect, the method further includes: sending fifth indication information to a first access network device, where the fifth indication information includes a second sequence number N, and the second sequence number indicates a sequence number of the $1^{st}$ data packet that is of the first service and that is sent by the second access network device to a second terminal device after handover of the second terminal device is completed.

According to a fourth aspect, a communication method is provided. The method is applied to a core network device, and includes: receiving a first data packet sent by a data server; sending a second data packet and first indication information to a first access network device, where the first indication information indicates a sequence of the second data packet in at least one data packet sent by the core network device; and sending a third data packet and second indication information to a second access network device, where the first indication information indicates a sequence of the third data packet in the at least one data packet of the core network device, where data in the second data packet and data in the third data packet are the same as data in the first data packet.

With reference to the fourth aspect, in some embodiments of the fourth aspect, the first indication information includes at least one of the following information: a general packet radio service tunneling protocol-user plane GTP-U sequence number and a first service sequence number, where the first service sequence number is set by the core network device or the data server, the first data packet is a data packet of a first service, and the at least one data packet is a data packet of the first service.

According to a fifth aspect, an access network device is provided. The access network device is a first access network device, a chip or a module in the first access network device, or a chip or a system on chip. The access network device includes: a transceiver unit, configured to receive a first data packet and first indication information from a core network device, where the first indication information indicates a sequence of the first data packet in at least one data packet; and a processing unit, configured to determine a first sequence number of a first protocol layer of the first data packet based on the first indication information, where the transceiver unit is further configured to send the first data packet to a terminal device.

With reference to the fifth aspect, in some embodiments of the fifth aspect, the first indication information includes at least one of the following information: a general packet radio service tunneling protocol-user plane GTP-U sequence number and a first service sequence number, where the first service sequence number is set by the core network device or a data server, the first data packet is a data packet of a first service, and the at least one data packet is a data packet of the first service.

With reference to the fifth aspect, in some embodiments of the fifth aspect, the first protocol layer includes at least one of the following: a service data adaptation protocol SDAP layer, a packet data convergence protocol PDCP layer, and a radio link control layer RLC layer.

With reference to the fifth aspect, in some embodiments of the fifth aspect, the processing unit is further configured to determine a start sequence number of the first protocol layer of the first data packet based on the first indication information in response to any one of establishment of a first protocol entity, re-establishment of the first protocol entity, and recovery of the first protocol entity occurs.

With reference to the fifth aspect, in some embodiments of the fifth aspect, the transceiver unit is further configured to send second indication information to the terminal device, where the second indication information indicates a sequence number of the $1^{st}$ data packet that is of the first service and that is sent by the first access network device to the terminal device after the first protocol entity is established, the first protocol entity is re-established, or the first protocol entity is recovered.

With reference to the fifth aspect, in some embodiments of the fifth aspect, the transceiver unit is further configured to receive third indication information from a second access network device, where the third indication information indicates the first access network device to stop forwarding a data packet to the second access network device; and the processing unit is configured to stop, based on the third indication information, forwarding the data packet to the second access network device.

With reference to the fifth aspect, in some embodiments of the fifth aspect, the transceiver unit is further configured to receive fourth indication information sent by the second access network device, where the fourth indication information indicates a sequence number of the $1^{st}$ data packet forwarded by the first access network device to the second access network device; and the processing unit is configured to forward a data packet to the second access network device based on the fourth indication information.

With reference to the fifth aspect, in some embodiments of the fifth aspect, the transceiver unit is further configured to receive fifth indication information sent by a second access network device, where the fifth indication information includes a second sequence number N, and the second sequence number indicates a sequence number of the $1^{st}$ data packet that is of the first service and that is sent by the second access network device to the terminal device after handover of the terminal device is completed; and the processing unit is configured to determine to stop, in response to a sequence number that is of a protocol layer and that corresponds to a data packet successfully sent by the first access network device to the terminal device being $N-1$, sending a data packet to the terminal device.

According to a sixth aspect, a terminal device is provided. The terminal device is a terminal device, is a chip or a module in the terminal device, or is a chip or a system on chip. The terminal device includes a transceiver unit, configured to receive second indication information sent by a first access network device, where the second indication information indicates a sequence number of the $1^{st}$ data packet that is of a first service and that is sent by the first access network device to the terminal device after a first protocol entity is established, the first protocol entity is re-established, or the first protocol entity is recovered.

With reference to the sixth aspect, in some embodiments of the sixth aspect, the transceiver unit is further configured to: in response to the first protocol entity is re-established or recovered, send request information to the first access network device, where the request information requests the first access network device to send the sequence number of the $1^{st}$ data packet that is of the first service and that is sent by the first access network device to the terminal device after the first protocol entity is re-established or the first protocol entity is recovered.

With reference to the sixth aspect, in some embodiments of the sixth aspect, the transceiver unit is further configured to send status report information of a data packet to a second access network device, where the status report information of the data packet indicates, to the second access network device, a data packet successfully received by the terminal device and a data packet unsuccessfully received by the terminal device, where the terminal device is handed over from the first access network device to the second access network device.

According to a seventh aspect, an access network device is provided. The access network device is a second access network device, a chip or a module in the second access network device, or a chip or a system on chip. The access network device includes: a transceiver unit, configured to receive a first data packet and first indication information from a core network device, where the first indication information indicates a sequence of the first data packet in at least one data packet; and a processing unit, configured to determine a second sequence number of a first protocol layer of the first data packet based on the first indication information, where the transceiver unit is configured to send the first data packet to a first terminal device.

With reference to the seventh aspect, in some embodiments of the seventh aspect, the first indication information includes at least one of the following information: a general packet radio service tunneling protocol-user plane GTP-U sequence number and a first service sequence number, where the first service sequence number is set by the core network device or a data server, the first data packet is a data packet of a first service, and the at least one data packet is a data packet of the first service.

With reference to the seventh aspect, in some embodiments of the seventh aspect, the first protocol layer includes at least one of the following: a service data adaptation protocol SDAP layer, a packet data convergence protocol PDCP layer, and a radio link control layer RLC layer.

With reference to the seventh aspect, in some embodiments of the seventh aspect, the processing unit is further configured to set a start sequence number of the first protocol layer of the first data packet based on the first indication information in response to any one of establishment of a first protocol entity, re-establishment of the first protocol entity, and recovery of the first protocol entity occurs.

With reference to the seventh aspect, in some embodiments of the seventh aspect, the transceiver unit is further configured to send second indication information to the terminal device, where the second indication information indicates a sequence number of the $1^{st}$ data packet that is of the first service and that is sent by a first access network device to the terminal device after the first protocol entity is established, the first protocol entity is re-established, or the first protocol entity is recovered.

With reference to the seventh aspect, in some embodiments of the seventh aspect, the transceiver unit is further configured to: receive a data packet sent by a first access network device, where a second terminal device connected to the first access network device is handed over from the first access network device to the second access network device, both the first terminal device and the second terminal device perform the first service, and the data packet sent by the first access network device is a data packet of the first service; and send third indication information to the first access network device in response to a second sequence number of a first protocol layer of a data packet that is being sent to the first terminal device being greater than or equal to a first sequence number a first protocol layer of the data packet that is sent by the first access network device, where the third indication information indicates the first access network device to stop forwarding a data packet to the second access network device.

With reference to the seventh aspect, in some embodiments of the seventh aspect, the transceiver unit is further configured to: receive status report information that is of a data packet and that is sent by the second terminal device, where the status report information of the data packet indicates, to the second access network device, a data packet successfully received by the terminal device and a data packet unsuccessfully received by the terminal device; and send fourth indication information to the first access network device based on the status report information, where the fourth indication information indicates a sequence number of the $1^{st}$ data packet forwarded by the first access network device to the second access network device.

With reference to the seventh aspect, in some embodiments of the seventh aspect, the transceiver unit is further configured to send fifth indication information to a first access network device, where the fifth indication information includes a second sequence number N, and the second sequence number indicates a sequence number of the $1^{st}$ data packet that is of the first service and that is sent by the second access network device to a second terminal device after handover of the second terminal device is completed.

According to an eighth aspect, a core network device is provided. The core network device is a core network device, a chip or a module in the core network device, or is a chip or a system on chip. The core network device includes a transceiver unit, configured to receive a first packet sent by a data server, where the transceiver unit is configured to send a second data packet and first indication information to a first access network device, where the first indication information indicates a sequence of the second data packet in at least one data packet sent by the core network device; and the transceiver unit is configured to send a third data packet and second indication information to a second access network device, where the first indication information indicates a sequence of the third data packet in the at least one data packet sent by the core network device, where data in the second data packet and data in the third data packet are the same as data in the first data packet.

With reference to the eighth aspect, in some embodiments of the eighth aspect, the first indication information includes at least one of the following information: a general packet radio service tunneling protocol-user plane GTP-U sequence number and a first service sequence number, where the first service sequence number is set by the core network device or the data server, the first data packet is a data packet of a first service, and the at least one data packet is a data packet of the first service.

According to a ninth aspect, a communication apparatus is provided, and includes a processor. The processor is connected to a memory. The memory is configured to store a computer program. The processor is configured to execute the computer program stored in the memory, to enable the apparatus to perform the method according to at least one embodiment, the method according to any one of the second aspect or the embodiments of the second aspect, the method according to any one of the third aspect or the embodiments of the third aspect, or the method according to any one of the fourth aspect or the embodiments of the fourth aspect.

According to a tenth aspect, a computer-readable storage medium is provided. The computer-readable storage medium stores a computer program. In response to the computer program is run, the method according to at least one embodiment, the method according to any one of the second aspect or the embodiments of the second aspect, the method according to any one of the third aspect or the embodiments of the third aspect, or the method according to any one of the fourth aspect or the embodiments of the fourth aspect is implemented.

According to an eleventh aspect, a chip is provided, and includes a processor and an interface. The processor is configured to read instructions to perform the method according to at least one embodiment, the method according to any one of the second aspect or the embodiments of the second aspect, the method according to any one of the third aspect or the embodiments of the third aspect, or the method according to any one of the fourth aspect or the embodiments of the fourth aspect.

In some embodiments, the chip further includes a memory. The memory stores instructions. The processor is configured to execute the instructions stored in the memory or other instructions.

According to a twelfth aspect, a communication system is provided. The system includes an apparatus that has a function of implementing the methods and the designs according to at least one embodiment, an apparatus that has a function of implementing the methods and the designs in the second aspect, an apparatus that has a function of implementing the methods and the designs in the third aspect, and an apparatus that has a function of implementing the methods and the designs in the fourth aspect.

DESCRIPTION OF EMBODIMENTS

Figure 1:
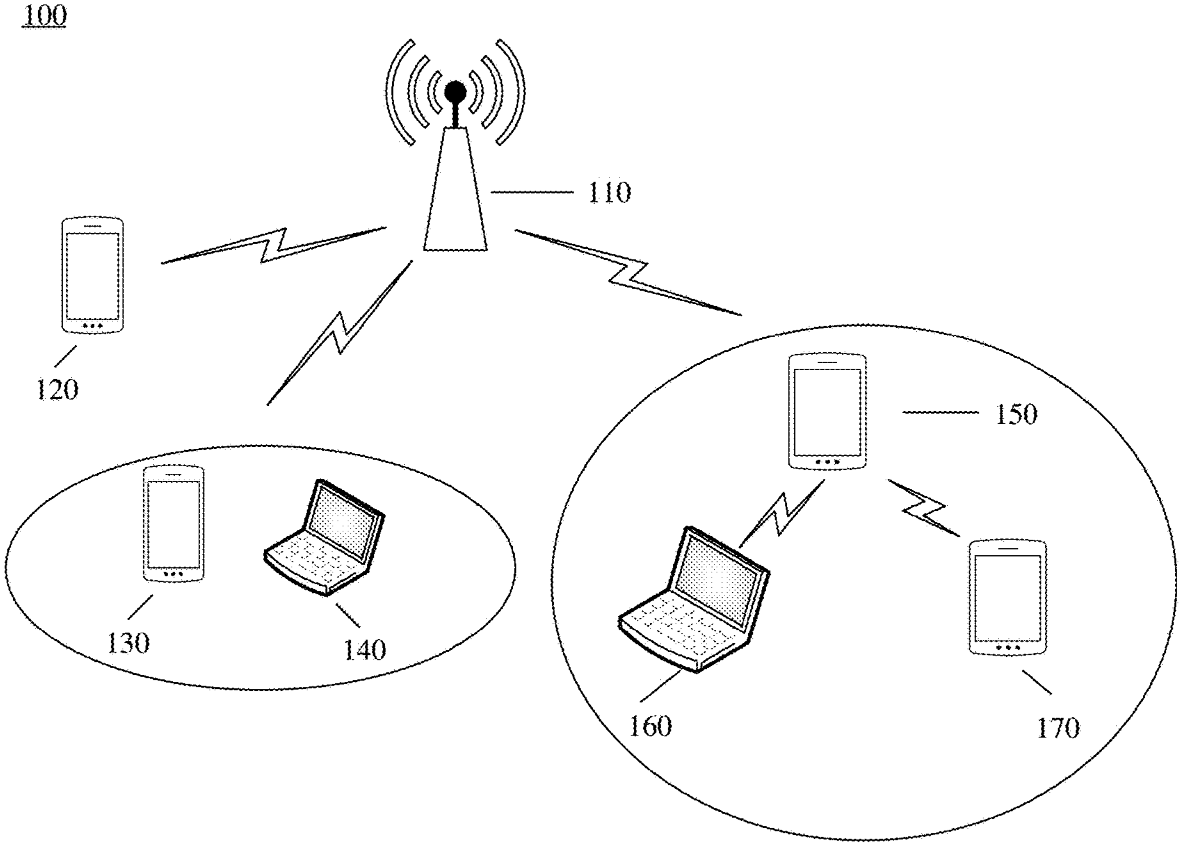
FIG. 1 is a schematic diagram of an application scenario according to some embodiments described herein.

The following describes technical solutions disclosed herein with reference to accompanying drawings.

To better understand the embodiments disclosed herein, terms that appear in embodiments are first explained.

The technical solutions in embodiments are be applied to various communication systems, for example, a global system for mobile communications (global system for mobile communications, GSM) system, a code division multiple access (code division multiple access, CDMA) system, a wideband code division multiple access (wideband code division multiple access, WCDMA) system, a general packet radio service (general packet radio service, GPRS) system, a long term evolution (long term evolution, LTE) system, an LTE frequency division duplex (frequency division duplex, FDD) system, an LTE time division duplex (time division duplex, TDD) system, a universal mobile telecommunication system (universal mobile telecommunication system, UMTS), a worldwide interoperability for microwave access (worldwide interoperability for microwave access, WiMAX) communication system, a 5th generation (5th generation, 5G) system, or a new radio (new radio, NR) system. In addition, the technical solutions is alternatively be applied to a subsequent evolved system, for example, a 6th generation 6G communication system or even a more advanced 7th generation 7G communication system.

A terminal device in embodiments is also be referred to as a user equipment (user equipment, UE), a mobile station (mobile station, MS), a mobile terminal (mobile terminal, MT), an access terminal, a subscriber unit, a subscriber station, a remote station, a remote terminal, a mobile device, a user terminal, a terminal, a wireless communication device, a user agent, a user apparatus, or the like.

The terminal device is a wireless terminal or a wired terminal. The wireless terminal refers to a device that provides a user with voice and/or other service data connectivity, a handheld device with a wireless connection function, or another processing device connected to a wireless modem. The wireless terminal communicates with one or more core networks through a radio access network (Radio Access Network, RAN). The wireless terminal is a mobile terminal, for example, a mobile phone (which is also referred to as a "cellular" phone), and a computer having the mobile terminal, for example, a portable, pocket-sized, handheld, computer built-in, or in-vehicle mobile apparatus, which exchanges voice and/or data with the radio access network. For example, the wireless terminal is a device such as a personal communications service (Personal Communication Service, PCS) phone, a cordless telephone set, a session initiation protocol (Session Initiation Protocol, SIP) phone, a wireless local loop (Wireless Local Loop, WLL) station, or a personal digital assistant (Personal Digital Assistant, PDA). The wireless terminal is also be referred to as a system, a subscriber unit (Subscriber Unit), a subscriber station (Subscriber Station), a mobile station (Mobile Station), a mobile station (Mobile), a remote station (Remote Station), a remote terminal (Remote Terminal), an access terminal (Access Terminal), a user terminal (User Terminal), a user agent (User Agent), a user equipment (User Device or User Equipment), a mobile internet device (mobile internet device, MID), a wearable device, a virtual reality (virtual reality, VR) device, an augmented reality (augmented reality, AR) device, a wireless terminal in industrial control (industrial control), a wireless terminal in self driving (self driving), a wireless terminal in remote surgery (remote medical surgery), a wireless terminal in a smart grid (smart grid), a wireless terminal in transportation safety (transportation safety), a wireless terminal in a smart city (smart city), a wireless terminal in a smart home (smart home), and a vehicle-mounted device, a wearable device, a terminal device in a 5G network, a terminal device in a future evolved public land mobile network (public land mobile network, PLMN), or the like. This is not limited in embodiments disclosed herein.

By way of example but not limitation, in embodiments disclosed herein, the wearable device is also be referred to as a wearable intelligent device, and is a generic term for wearable devices such as glasses, gloves, watches, clothes, and shoes that are developed based on intelligent design of daily wearing by using wearable technologies. The wearable device is a portable device that is directly worn or integrated into clothes or an accessory of a user. The wearable device is not only a hardware device, but also implements a powerful function through software support, data exchange, and cloud interaction. Generalized wearable intelligent devices include full-featured and large-size devices that can implement complete or partial functions without depending on smartphones, for example, smart watches or smart glasses, and devices that focus only on one type of application function and to work with other devices such as smartphones, for example, various smart bands or smart jewelry for monitoring physical signs.

In addition, in embodiments disclosed herein, the terminal device is alternatively be a terminal device in an internet of things (internet of things, IoT) system. An IoT is an important component of future information technology development. A main technical feature of the IoT is connecting things to networks by using communication technologies, to implement an intelligent network for interconnection between persons and machines and between things.

In response to the various terminal devices described above being located in a vehicle (for example, placed in the vehicle or installed in the vehicle), the terminal devices are all considered as vehicle-mounted terminal devices. The vehicle-mounted terminal devices are also referred to as, for example, on board units (on-board unit, OBU).

In embodiments disclosed herein, the terminal device further include a relay (relay). Alternatively, it is understood as that any device that can perform data communication with a base station is considered as a terminal device.

An access network device in embodiments disclosed herein is a device configured to communicate with a terminal device, a base station, an access point, or a network device, or refer to a device that communicates with a wireless terminal over an air interface in an access network by using one or more sectors. The network device is configured to mutually convert a received over-the-air frame and an IP packet and serve as a router between the wireless terminal and a remaining portion of the access network, where the remaining portion of the access network includes an internet protocol (IP) network. The network device is further coordinate attribute management of the air interface. For example, the access network device is a base transceiver station (Base Transceiver Station, BTS) in a global system for mobile communication (Global System of Mobile communication, GSM) or code division multiple access (Code Division Multiple Access, CDMA), a NodeB (NodeB, NB) in wideband code division multiple access (Wideband Code Division Multiple Access, WCDMA), is an evolved NodeB (evolved NodeB, eNB or eNodeB) in an LTE system, or is a radio controller in a cloud radio access network (cloud radio access network, CRAN) scenario. Alternatively, the access device is a relay station, an access point, a vehicle-mounted device, a wearable device, an access device in a 5G network, a network device in a future evolved PLMN network, or the like, is an access point (access point, AP) in a WLAN, or may be a gNB in a new radio (new radio, NR) system. This is not limited in embodiments disclosed herein. In a 5G system, there are one or more transmission reception points (Transmission Reception Point, TRP) in one base station. All TRPs belong to a same cell. The measurement reporting method in embodiments disclosed herein are used for each TRP and each terminal. In another scenario, the network device may be further divided into a control unit (Control Unit, CU) and a data unit (Data Unit, DU). One CU corresponds to a plurality of DUs. The measurement reporting method in embodiments disclosed herein are used for each DU and each terminal. A difference between a CU-DU split scenario and a multi-TRP scenario lies in: The TRP is a radio frequency unit or an antenna device while the DU can implement a protocol stack function, for example, a physical layer function.

In addition, in embodiments disclosed herein, the access network device is a device in the access network (radio access network, RAN), in other words, is a RAN node that connects the terminal device to a wireless network. For example, by way of example but not limitation, the access network device is a gNB, a transmission reception point (transmission reception point, TRP), an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB or a home NodeB, HNB), a base band unit (base band unit, BBU), or a wireless fidelity (wireless fidelity, Wi-Fi) access point (access point, AP).

The access network device serves a cell. The terminal device communicates with the access network device by using a transmission resource (for example, a frequency domain resource or a spectrum resource) used for the cell. The cell is a cell corresponding to the access network device (for example, a base station). The cell belongs to a macro base station, or belongs to a base station corresponding to a small cell (small cell). The small cell herein includes a metro cell (metro cell), a micro cell (micro cell), a pico cell (pico cell), a femto cell (femto cell), or the like. The small cells have features of small coverage and a low transmit power, and are suitable for providing a high-rate data transmission service.

Unicast (unicast): a point-to-point communication technology, to be specific, single-point communication between a network device and a terminal device. The network device separately sends data to each terminal device. The unicast is also referred to as a unicast transmission mode or a unicast transmission technology.

Sending performed in the unicast transmission mode means: In response to sending a transport block (transport block, TB) corresponding to a protocol data unit (protocol data unit, PDU), a sending apparatus scrambles, by using a cell radio network temporary identifier (cell network temporary identifier, C-RNTI), the PDU or downlink control information (downlink control information, DCI) corresponding to the PDU, and a receiving apparatus receives the same PDU based on the C-RNTI. Alternatively, transmitting a PDU in the unicast mode means: The PDU is transmitted on a radio bearer established for unicast transmission or on a channel specially designed for the unicast.

Receiving performed in the unicast transmission mode means: In response to sending being performed in the unicast mode, the receiving apparatus receives the PDU based on the C-RNTI, or the receiving apparatus receives the PDU on the radio bearer established for the unicast transmission or on the channel used for the unicast transmission.

Multicast (multicast): a point-to-multipoint communication technology, which is also referred to as a multicast transmission mode or a multicast transmission technology, and is for serving a multimedia broadcast multicast service. The multicast is also referred to as groupcast, and is also referred to as a broadcast technology in some generalized scenarios. However, the multicast is different from a conventional broadcast technology. In response to the multicast transmission mode being used, a plurality of terminal devices simultaneously receive a same piece of data in a process in which a network device (for example, a base station) sends the data. Currently, multicast transmission technologies are classified into two types: a multimedia broadcast multicast service single frequency network (multimedia broadcast multicast service single frequency network, MBSFN) service and a single-cell point-to-multipoint (single cell point to multipoint, SC-PTM) service. In addition, another multicast transmission technology is also discussed. This is not limited in the present invention.

Sending performed in the multicast transmission mode means: In response to sending a transport block (transport block, TB) corresponding to a protocol data unit (protocol data unit, PDU), a sending apparatus scrambles, by using a group radio network temporary identifier (group radio network temporary identifier, G-RNTI), the PDU or downlink control information (downlink control information, DCI) corresponding to the PDU, and one or more receiving apparatuses receive the same PDU based on the same G-RNTI. Alternatively, transmitting a PDU in the multicast mode means: A plurality of receiving apparatuses are notified of a location of a same PDU in a semi-persistent manner, and the plurality of receiving apparatuses simultaneously receive the PDU. Alternatively, transmitting a PDU in the multicast mode means: The PDU is transmitted on a radio bearer established for multicast transmission or on a channel specially designed for the multicast.

Receiving performed in the multicast transmission mode means: In response to sending being performed by a peer side in the multicast mode, one of the plurality of receiving apparatuses receives the PDU based on the G-RNTI, or one of the plurality of receiving apparatuses receives the PDU on the radio bearer established for the multicast transmission or on the channel used for the multicast transmission.

Broadcast: a point-to-multipoint communication technology. Different from multicast, the technology related to the broadcast is: A sending apparatus sends a TB corresponding to a PDU on a broadcast channel, and all receiving apparatuses receive the PDU on the broadcast channel. Different from a multicast technology, in conventional broadcast transmission, the foregoing scrambling manner using the G-RNTI is not used for the broadcast channel.

Handover (handover, HO): An ongoing call is handed over from a wireless channel to another wireless channel, to ensure that communication is not interrupted. In a wireless communication system, each cell covers a limited range. Therefore, in response to a terminal device moving from a current serving cell to a neighboring cell, to ensure service continuity, a network side hands over a service to the neighboring cell, so that a communication process is not interrupted. The handover is a process in which a link carrying communication data is handed over from a cell (or a base station) to another cell (or another base station) in a communication process, to ensure that communication is not interrupted.

Protocol stack (Protocol Stack): A network device and a terminal device have specific protocol layer structures that are used for mutual communication. For example, a control plane protocol layer structure includes a radio resource control (radio resource control, RRC) layer, a packet data convergence protocol (Packet Data Convergence Protocol, PDCP) layer, a radio link control (radio link control, RLC) layer, a media access control (media access control, MAC) layer, and a physical layer. A user plane protocol layer structure includes a PDCP layer, an RLC layer, a MAC layer, a physical layer, and the like. The physical layer is located at the lowest layer (layer 1), the MAC layer, the RLC layer, and the PDCP layer belong to the second layer (layer 2), and the RRC layer belongs to the third layer (layer 3). In an implementation, a service data adaptation protocol (service data adaptation protocol, SDAP) layer is further included above the PDCP layer. In addition, a transport layer, for example, a transmission control protocol/internet protocol (Transmission Control Protocol/Internet Protocol, TCP/IP) layer, and an application layer, further exists above the SDAP layer.

Functions of the protocol layers are implemented by one node, or implemented by a plurality of nodes. For example, in an evolved structure, a radio access network device includes a centralized unit (centralized unit, CU) and a distributed unit (distributed unit, DU). A plurality of DUs are centrally controlled by one CU. The CU and the DU are obtained through division based on a protocol layer of a wireless network. For example, functions of the PDCP layer and a layer above the PDCP layer are set on the CU, and functions of a protocol layer below the PDCP layer, the RLC layer, the MAC layer, and the like are set on the DU.

Division based on the protocol layer is an example, and division is alternatively be performed based on another protocol layer. For example, division is performed based on the RLC layer. Functions of the RLC layer and a layer above the RLC layer are set on the CU, and a function of a protocol layer below the RLC layer is set on the DU. Alternatively, division is performed at a protocol layer. For example, a part of functions of the RLC layer and a function of a protocol layer above the RLC layer are set on the CU, and a remaining function of the RLC layer and a function of a protocol layer below the RLC layer are set on the DU. In addition, division is alternatively performed in another embodiment. For example, division is performed based on a latency. A function whose processing time satisfies a latency requirement is set on the DU, and a function whose processing time does not satisfy the latency requirement is set on the CU.

Radio bearer (Radio Bearer): Generally, the radio bearer is understood as a transmission path or treatment (treatment) used in response to a data packet or signaling being transmitted over an air interface. Radio bearers include a data radio bearer and a signaling radio bearer. The radio bearer is established and configured by using RRC signaling of a network device. A configuration of the radio bearer includes configurations of protocol layers. Protocol layer entities of the network device and a terminal device send, receive, or process the data packet or the signaling on the radio bearer based on the configuration. Technically, the radio bearer is understood as a transmission channel. Regardless of a terminal device side or a network device side, each radio bearer includes one PDCP entity and at least one RLC entity to process the data packet transmitted on the radio bearer. In addition to establishing the radio bearer, the network device further adds, modifies, or deletes (release) the radio bearer by using RRC signaling.

A multimedia broadcast multicast service is used for a point-to-multipoint unidirectional multimedia service. For example, a multimedia broadcast service is sent to a user in a cell on a common channel over an air interface, or a multicast service subscribed to by a user in a cell is sent to the user in a multicast mode, so that air interface resources are reduced.

The following describes a scenario in at least one embodiment disclosed herein. FIG. 1 is a schematic diagram of an application scenario 100 according to at least one embodiment disclosed herein. In FIG. 1, an access network device 110, a terminal device 120, a terminal device 130, a terminal device 140, a terminal device 150, a terminal device 160, and a terminal device 170 are included. For example, the access network device 110 works in an evolved universal mobile telecommunication system terrestrial radio access (evolved UMTS terrestrial radio access, E-UTRA) system, works in an NR system, or works in a next-generation communication system or another communication system. The access network device 110 communicates with the terminal device 120 to the terminal device 170 through a Uu interface. In the communication system, the terminal device 120 to the terminal device 170 sends uplink data to the access network device 110, and the access network device 110 sends downlink data to the terminal device 120 to the terminal device 170. In addition, a communication system alternatively includes the terminal device 150 to the terminal device 170. The access network device 110 sends downlink data to the terminal device 120 to the terminal device 150, where the access network device 110 sends downlink data to the terminal device 120 and the terminal device 150 in a unicast mode, and the access network device 110 sends downlink data to the terminal device 130 and the terminal device 140 in a multicast mode. The terminal device 150 alternatively sends downlink data to the terminal device 160 and the terminal device 170.

The access network device in FIG. 1 is, for example, a base station. The access network device corresponds to different devices in different systems. For example, the access network device corresponds to an eNB in a 4G system, and corresponds to an access network device, for example, a gNB, in 5G in a 5G system. The technical solutions provided in embodiments disclosed herein are alternatively applied to a future mobile communication system. Therefore, the access network device in FIG. 1 alternatively corresponds to an access network device in the future mobile communication system. In FIG. 1, an example in which the access network device is the base station is used. Actually, for the access network device, refer to the foregoing descriptions.

The communication system shown in FIG. 1 further includes more network nodes, for example, another terminal device or access network device. The access network devices or the terminal devices included in the communication system shown in FIG. 1 is the foregoing access network devices or terminal devices in various forms. These are not shown one by one in the figure in embodiments disclosed herein.

The technical solutions disclosed herein are alternatively applied to another communication system provided that a transmission direction is indicated in the communication system. In addition, the embodiments disclosed herein are not only applicable to a scenario (for example, an SC-PTM scenario) in which one access network device and a plurality of UEs, but also applicable to a scenario (for example, an MBSFN scenario) in which a plurality of access network devices coordinate to simultaneously perform data communication with a plurality of UEs and a multicast/broadcast scenario in 5G.

Figure 2:
FIG. 2 is a schematic flowchart of a communication method according to some embodiments disclosed herein.
Figure 2:
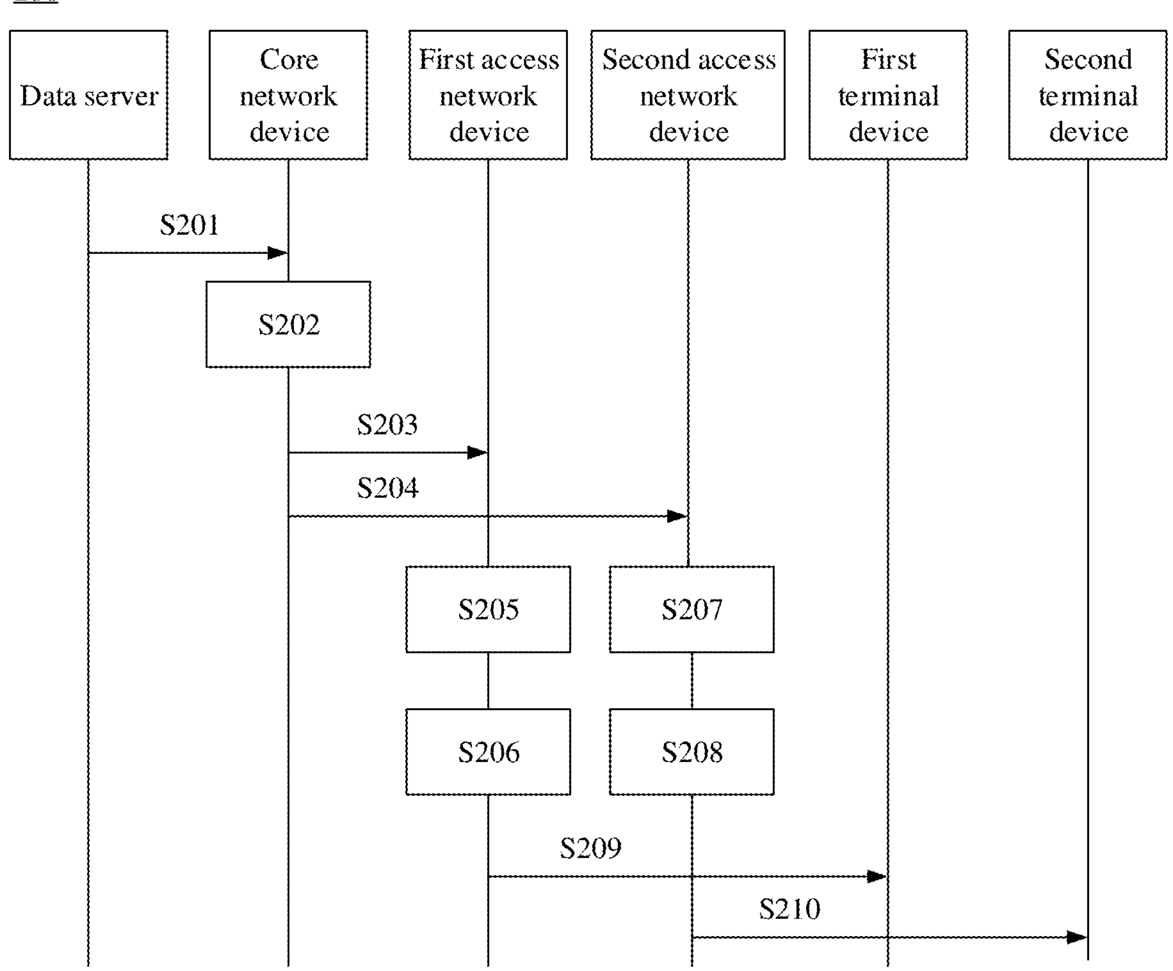

The following describes in detail, with reference to FIG. 2, a communication method provided in some embodiments. FIG. 2 is a schematic flowchart of a communication method 200 according to at least embodiment disclosed herein. The method 200 is applied to the scenario shown in FIG. 1, or certainly is applied to another communication scenario. This is not limited in this embodiment.

In some embodiments disclosed herein, the method is described by using an example in which terminal devices, access network devices, and a core network device perform the method. By way of example but not limitation, the method is alternatively performed by chips, chip systems, processors, or the like used in terminal devices, access network devices, and a core network device.

As shown in FIG. 2, the method 200 shown in FIG. 2 includes S201 to S210. The following describes in detail the steps in the method 200 with reference to FIG. 2.

S201: A data server sends at least one data packet of a first service to the core network device.

Optionally, the data server includes progress indication information of the first service in the at least one data packet of the first service in response to sending the at least one data packet to the core network device. The progress indication information indicates a sequence of a current data packet in the at least one data packet of the first service. The progress indication information of the first service is a sequence number of the first service. The progress indication information is carried in a data packet, for example, in a header of the data packet. Alternatively, the indication information is separately sent, which is independent from the sending of the data packet.

Optionally, before S201, the data server receives request information sent by the core network device. The request information requests the data server to include the progress indication information of the first service in the at least one data packet of the first service in response to the data server sending the at least one data packet to the core network device. In response to receiving the request information sent by the core network device and sending the at least one data packet of the first service to the core network device, the data server includes the progress indication information of the first service in each data packet.

Optionally, the first service is an MBMS service.

S202: The core network device receives the at least one data packet that is of the first service and that is sent by the data server.

Specifically, in response to receiving the at least one data packet that is of the first service and that is sent by the data server, the core network device determines an access network device to receive the first service, thereby separately sending the at least one data packet to different access network devices.

S203: The core network device sends a first data packet and first indication information to a first access network device, where the first indication information indicates a sequence of the first data packet in the at least one data packet sent by the core network device.

In some embodiments disclosed herein, S201 and S202 are optional steps, and S203 unnecessarily depends on S201 and S202. Specifically, a data packet received by the core network device is received from another place or generated by the core network device. Optionally, the core network device alternatively receives the progress indication information from another place, and determine positions of data packets based on the progress indication information. In addition, how a core network device sends the data packets to the different access network devices is not limited.

S204: The core network device sends a second data packet and second indication information to a second access network device, where the first indication information indicates a sequence of the second data packet in the at least one data packet sent by the core network device. Data in the first data packet is the same as or different from data in the second data packet. This is not limited. In response to data in a data packet received by the first access network device being the same as data in a data packet received by the second access network device, the first indication information is the same as the second indication information.

For example, in response to the core network device sending five data packets whose core network sequence numbers are 1 to 5 to the first access network device, and sends five data packets whose core network sequence numbers are 5 to 9 to the second access network device, content and a size of the last data packet in the five data packets received by the first access network device are the same as those of the 1$^{st}$ data packet in the five data packets received by the second access network device, and indication information corresponding to the two data packets is the same.

Specifically, when the core network device sends the at least one data packet of the first service to the access network device, the at least one data packet carries the first indication information, so that the access network device can learn of sending progress of the first service. The first indication information is implemented by setting a core network sequence number for the data packet. In response to sending, to the different access network devices, the data packets received from the data server, the core network device enables same data packets (where carried content or carried payloads are the same) to carry same core network sequence numbers, namely, same first indication information, where the first indication information identifies a sequence of the data packet in at least one sent data packet.

Optionally, the first indication information includes at least one of the following information: a general packet radio service tunneling protocol-user plane sequence number (GPRS Tunneling Protocol-U Sequence Number, GTP-U SN) and the first service sequence number. The first service sequence number is set by the core network device or the data server, the first data packet is a data packet of the first service, and the at least one data packet is a data packet of the first service.

The following briefly describes the first service sequence number by using the GTP-U sequence number as an example. Currently, during data transmission between the core network device and the access network device, the core network device establishes different PDU sessions or GTP tunnels with the different access network devices for separate operation. Therefore, even if the core network device receives same data packets from the data server, the core network device sets different GTP-U SN in response to sending the same data packets to the different access network devices. However, in some embodiments, the core network device sets, in response to sending same data packets received by the core network device from the data server or generated by the core network device to the different access network devices, same GTP-U SN for the data packets. In an embodiment, a GTP-U SN is set for each data packet based on indication information of the data server. In this way, because the GTP-U SN is associated with content of the data packet, the different access network devices determine service transmission progress based on the GTP-U SN.

Optionally, when the data server sends the at least one data packet of the first service to the core network device, in response to the at least one data packet carrying at least one first service sequence number respectively corresponding to the at least one data packet, the core network device sends the first indication information to the access network device based on the first service sequence number. The first indication information is the first service sequence number carried in the at least one data packet. When the data server sends the at least one data packet of the first service to the core network device, in response to the at least one data packet not carrying the first service sequence number, the core network device resets a first service sequence number of the at least one data packet based on a sequence of receiving the at least one data packet. For example, in response to the core network device receiving a data packet 1, a data packet 2, and a data packet 3 from the data server, the core network device sets a first service sequence number 1 for the data packet 1, set a first service sequence number 2 for the data packet 2, and set a first service sequence number 3 for the data packet 3.

S205: The first access network device receives the first data packet and the first indication information from the core network device.

A specific implementation in which S205 depends on the foregoing steps is not limited in some embodiments disclosed herein provided that the first data packet and the first indication information are received from the core network device.

S206: The first access network device determines a first sequence number of a first protocol layer of the first data packet based on the first indication information.

Optionally, the first protocol layer includes at least one of the following protocol layers: a service data adaptation protocol SDAP layer, a packet data convergence protocol PDCP layer, and a radio link control layer RLC layer.

The first protocol layer is an upper-layer protocol layer on a radio access network side, the first protocol layer is also referred to as a layer 2 protocol layer, and SDAP, PDCP, RLC, and MAC all belong to layer 2 protocols. In addition, in a subsequent technology, a new protocol layer may be introduced for a new function. Therefore, in some embodiments disclosed herein, the first protocol layer is not limited to an existing protocol layer, or is a newly defined protocol layer.

Specifically, after receiving the first data packet, the first access network device determines the first sequence number of the first protocol layer of the first data packet based on the first indication information. The first sequence number of the first protocol layer is used by the first protocol layer to process the first data packet, for example, perform sorting or duplicate detection.

Optionally, in response to the first access network device establishing a first protocol layer entity for multicast transmission, a re-establishment (re-establishment) process occurs on the first protocol layer entity that has been established and that is for the multicast transmission, or a data recovery (data recovery) process of the first protocol layer entity occurs, the first protocol layer entity of the first access network device determines a start sequence number of the first data packet based on the first indication information. A PDCP entity is used as an example. After a PDCP entity for the multicast transmission is re-established, the access network device receives first indication information of the $1^{st}$ data packet. For example, in response to the first indication information being a core network sequence number, a core network sequence number corresponding to the $1^{st}$ data packet is 5. In some embodiments disclosed herein, the access network device also sets a PDCP sequence number of the $1^{st}$ data packet to 5 instead of 0 from which the PDCP sequence number starts in a conventional technology. Even if the first protocol layer entity is re-established or recovered, it can be ensured that information corresponding to a data packet is current actual service progress information.

S207: The second access network device receives the second data packet and the first indication information from the core network device.

S208: The second access network device determines a second sequence number of a first protocol layer of the second data packet based on the first indication information.

In step S206 and step S208, in response to receiving the data packets and the core network sequence numbers that are sent by the core network device, the first access network device and the second access network device determine the sequence numbers of the received data packets. To understand the step more clearly, the following briefly describes the step with reference to FIG. 6. The first access network device receives a first data packet whose core network sequence number GTP-U SN is 8, and the first access network device determines, based on the GTP-U SN of the first data packet, that a PDCP SN of the first data packet is 8. The second access network device receives a data packet whose core network sequence number GTP-U SN is 11, and the second access network device determines, because the GTP-U SN of the second data packet is 11, that a PDCP SN of the second data packet is 11. PDCP is an example of a first protocol layer.

The second access network device is alternatively the first access network device. For descriptions of the second access network device, refer to the foregoing descriptions of the first access network device. Details are not described herein again.

The core network device sends same first services to the first access network device and the second access network device, and includes same first indication information in data packets having same content, so that the first access network device and the second access network device can determine, based on the same first indication information, same sequence numbers of first protocol layers for the data packets having the same content. That is, sequence numbers that are of first protocol layers and that are determined by different access network devices are the same for data packets having same data. Therefore, in a process in which a terminal device is handed over from the first access network device to the second access network device, the second access network device learns of first service progress of the first access network device based on SN status forwarding and data forwarding steps in an existing handover procedure, without introducing additional progress information between the two access network devices.

Some embodiments disclosed herein involve a plurality of sequence numbers. Sequence numbers of protocol layers of the data server, the core network device, the access network device, and the terminal device is set for the protocol layers. For example, a core network sequence number is a sequence number set by the core network device for a data packet, and a PDCP sequence number is a sequence number set by a PDCP layer of the access network device or the terminal device for the data packet. Different sequence numbers have different functions in different packets of a same data packet, and are visible only to a corresponding device or protocol layer. In addition, the "sequence number" is a general term for all sequence numbers, and is not limited to a specific sequence number. A specific sequence number is specifically determined based on a scenario. For example, a sequence number of a PDCP layer is a PDCP sequence number.

In response to a data packet being sent from the core network device to the access network device and then to the terminal device, the data packet is processed (where for example, a header of the data packet is added) at many different protocol layers. The processing is used for transmission. After the processing, a size or a form of the data packet changes. However, provided that content of a payload of the data packet does not change, the data packet is referred to as a same data packet, for example, the first data packet.

S209: The first access network device sends the first data packet to a first terminal device.

Optionally, the first access network device sends second indication information to the first terminal device. The second indication information indicates a sequence number of the $1^{st}$ data packet that is of the first service and that is sent by the first access network device to the first terminal device after a first protocol entity of the first terminal device is established, the first protocol entity is re-established, or data recovery occurs on the first protocol entity.

In an embodiment, before the first terminal device starts to receive the first service, in response to the first protocol entity being established, the first terminal device first obtains, from the first access network device, configuration information for receiving the first protocol entity. The first access network device includes the second indication information in the configuration information, where the second indication information indicates a sequence number (for example, a PDCP SN) of the $1^{st}$ data packet that is of the first service and that is sent by the first access network device. In this way, the terminal device learns of the sequence number of the $1^{st}$ data packet that should be received. In response to a sequence number of the $1^{st}$ received data packet being greater than the sequence number indicated by the indication information, it indicates that a data packet is lost. The terminal device determines a lost data packet and request the access network device to retransmit the lost data packet.

In addition, in response to a re-establishment process or a data recovery process occurs on the first protocol entity used by the terminal device to transmit the first service, the access network device also sends the second indication information to the first terminal device, where the second indication information indicates the sequence number (for example, the PDCP SN) of the $1^{st}$ data packet that is of the first service and that is sent by the first access network device. Therefore, a data packet loss caused by inconsistent understanding of the $1^{st}$ data packet by the first terminal device and the first access network device can be avoided.

S210: The second access network device sends the second data packet to a second terminal device.

Optionally, the second access network device sends the second indication information to the second terminal device. For specific descriptions, refer to related descriptions in S209. Details are not described herein again.

According to the communication method 200 provided in some embodiments, in the process in which the terminal device is handed over from the first access network device to the second access network device, the second access network device learns of the first service progress of the first access network device based on the SN status forwarding and data forwarding steps in the existing handover procedure, without introducing the additional progress exchange information between the two access network devices. In this way, a case in which a redundant data packet is received by the terminal or service data is interrupted because multicast service progress of the different access network devices is inconsistent can be avoided.

Figure 3:
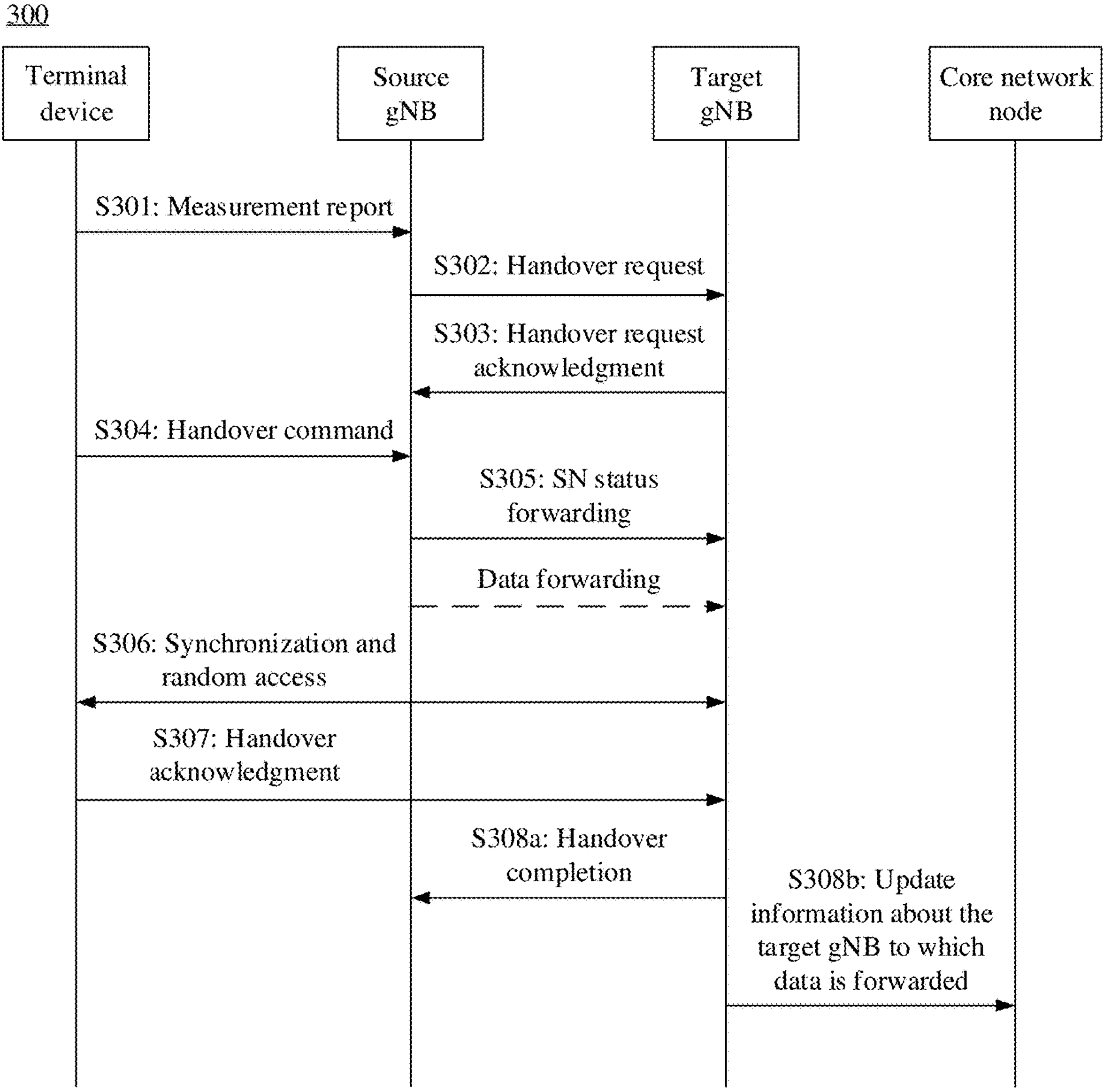
FIG. 3 is a schematic flowchart of a method for handing over a terminal device between access network devices in a conventional technology.

To better understand beneficial effects of the method provided in some embodiments, the following briefly describes a procedure of handing over a terminal device between access network devices (for example, base stations) in a conventional technology. The procedure of the handover between the base stations (gNBs) is shown in FIG. 3. FIG. 3 is a schematic flowchart of a method 300 of handing over the terminal device between the access network devices in the conventional technology. The handover is initiated by a source gNB. The source gNB (Source gNB, SgNB) determines to hand over a UE based on a measurement report reported by the UE, and initiates a handover request to a target gNB (Target gNB, TgNB). After the SgNB obtains a positive handover acknowledgment from the TgNB, the SgNB sends a handover command to the UE. After the UE receives the handover command, the UE stops uplink or downlink data transmission with the SgNB, starts to synchronize with the TgNB, and initiates a random access process. In response to sending the handover command to the UE, the SgNB stops performing uplink or downlink data transmission with the UE, and sends data stored in the SgNB to the TgNB. After successfully accessing the TgNB, the UE starts to transmit uplink or downlink data with the TgNB. The method 300 shown in FIG. 3 includes S301 to S308. The following briefly describes steps in the method 300 with reference to FIG. 3.

S301: In a handover preparation phase, the UE in an RRC connected state sends the "measurement report" (Measurement Report) according to a measurement reporting trigger criterion configured by the gNB.

S302: The source gNB determines the target gNB for the UE based on the measurement report of the UE and a radio resource management algorithm RRM algorithm in response to the UE meeting a handover condition, and sends UE context (UE Context) information to the target gNB via the handover request.

S303: The target gNB makes preparations for the UE to be handed over to the target gNB, allocates a cell identity parameter C-RNTI and another parameter to the UE, and returns the C-RNTI and the another parameter to the source gNB via a handover request acknowledgment message. After receiving the handover request acknowledgment message, the source gNB prepares to forward packet data to the target gNB.

S304: The SgNB sends the "handover command" (Handover Command) to the UE (where the handover command includes the following information: a new C-RNTI, a SIB of the target gNB, and configuration information of the UE such as configurations of MAC, RLC, and PDCP layers). After receiving the handover command, the UE stops the uplink or downlink data transmission with the source gNB, and synchronizes with the target gNB.

In some embodiments disclosed herein, the source gNB forwards, to the target gNB, buffered uplink data sent by the UE and buffered downlink data sent by a UPF.

S305: The source gNB sends SN status information and forwards data (a dashed-line step) to the target gNB.

S306: After disconnecting data transmission with the source gNB, the UE starts a downlink synchronization process with the target gNB, and then initiates the random access process to obtain uplink timing and uplink resource allocation. The target gNB sends a tracking area TA to the UE and indicates, to the UE, a resource allocated to the UE. The information is used by the UE to send an RRC connection reconfiguration complete message to the target gNB, to indicate handover completion.

S307: The UE sends "handover acknowledgment" information to the target gNB, to indicate the handover completion.

S308: The target gNB indicates the handover completion to the source gNB, so that the source gNB releases the UE context information.

In addition, the target gNB notifies a core network node to update information about the target gNB to which data is forwarded, so that the core network can send data of the UE to the target gNB.

Figure 4:
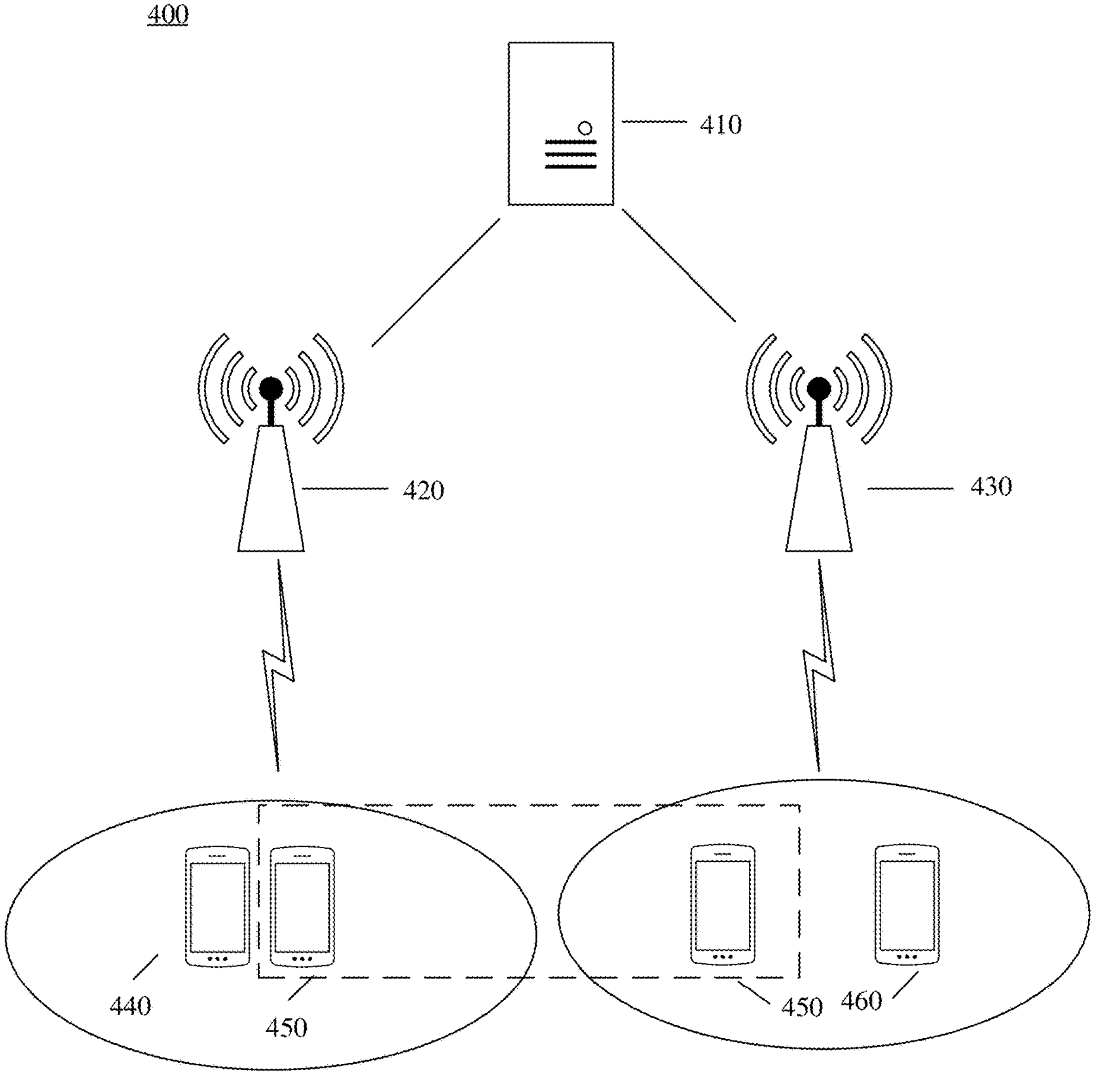
FIG. 4 is a schematic diagram of an application scenario of a multicast service according to some embodiments disclosed herein.

In a conventional technology, in some multicast scenarios, a UE receives a multicast (groupcast) service from a base station, moves at a moment, and performs a handover procedure to be handed over to another base station to receive a multicast service. In response to progress of the multicast services of the two base stations being inconsistent, the existing handover procedure causes the UE to receive a redundant data packet or cause data interruption of the UE. FIG. 4 is a schematic diagram of a multicast service handover scenario 400. In FIG. 4, a core network device 410, an access network device 420, an access network device 430, a terminal device 440, and a terminal device 450 are included. The access network device 420 and the access network device 430 receive multicast service data sent by the core network device 410, and send the multicast service data to terminal devices within coverage of the access network device 420 and the access network device 430. The terminal device 450 is handed over from the access network device 420 to the access network device 430. Progress of multicast services of the access network device 420 and the access network device 430 is inconsistent. An existing handover procedure causes the terminal device 450 to receive a redundant data packet or cause data interruption of the terminal device 450.

Figure 5:
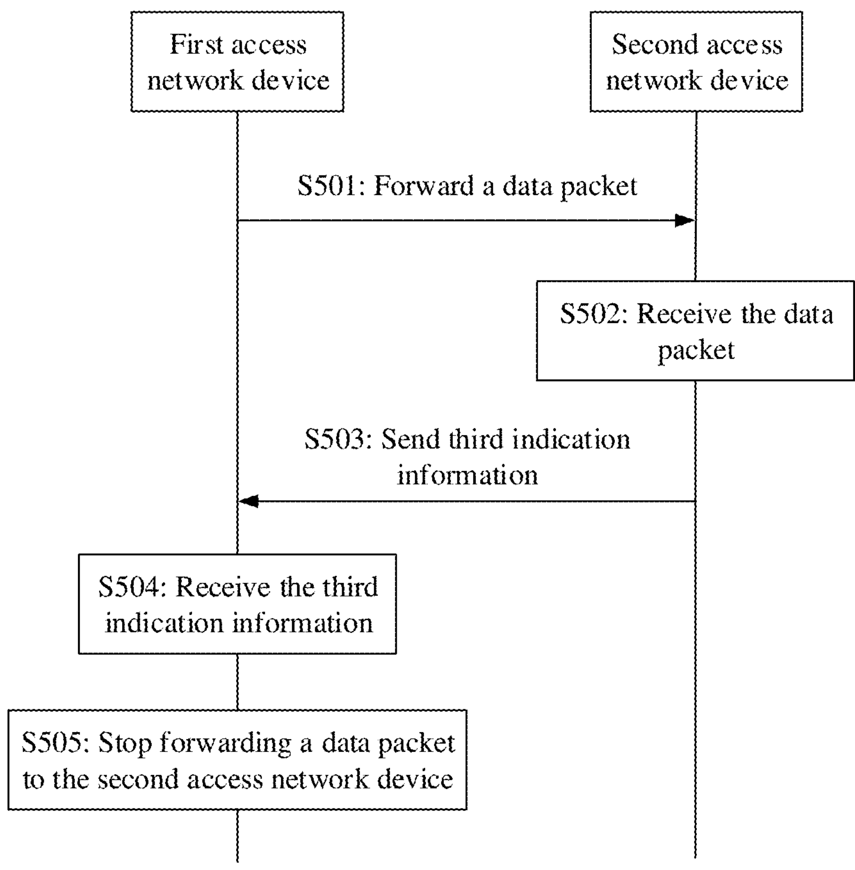
FIG. 5 is a schematic flowchart of a communication method according to some embodiments disclosed herein.

To resolve the problem, some embodiments provide a communication method 500. The following describes in detail, with reference to FIG. 5, a communication method provided in some embodiments. FIG. 5 is a schematic flowchart of the communication method 500 according to at least one embodiment disclosed herein. The method 500 is applied to the scenario shown in FIG. 1, or certainly is applied to another communication scenario. This is not limited in this embodiment. In the method 500, a first terminal device connected to a first access network device is handed over from the first access network device to a second access network device, and both the first access network device and the second access network device perform a first service.

Before and after the handover of the first terminal device, the first terminal device processes, by using a same protocol entity, data packets received from the first access network device and the second access network device before and after the handover, for example, performs sorting or duplicate detection.

In some embodiments, the method is described by using an example in which the terminal device and the access network devices perform the method. By way of example but not limitation, the method is alternatively performed by chips, chip systems, processors, or the like used in the terminal device and the access network devices.

As shown in FIG. 5, the method 500 shown in FIG. 5 includes S501 to S505. The following describes in detail the steps in the method 500 with reference to FIG. 5.

S501: The first access network device forwards a data packet to the second access network device, where the data packet sent by the first access network device is a data packet of the first service.

S502: The second access network device receives the data packet sent by the first access network device.

Specifically, in a handover process, the first access network device forwards, to the second access network device, data that is sent by a core network device and that is not successfully sent to the first terminal device. This is a data forwarding process. Both sequence numbers of first protocol layers of the two access network devices are determined based on first indication information sent by the core network device. Therefore, for data packets having same content, sequence numbers that are of first protocol layers and that are determined by the two access network devices are the same. Therefore, after receiving the data packet forwarded by the first access network device, the second access network device can learn of sending progress of the first service in the first access network device based on a sequence number of a first protocol layer of the data packet, and can use a corresponding sending policy to ensure service continuity of the first terminal device.

S503: The second access network device determines, based on a second sequence number of a first protocol layer of a data packet that is being sent to the first terminal device and a first sequence number of a first protocol layer of the data packet received from the first access network device, whether to send third indication information to the first access network device, where the third indication information indicates the first access network device to stop forwarding a data packet to the second access network device.

Optionally, in response to the second sequence number of the first protocol layer of the data packet that is being sent by the second access network device to the first terminal device being greater than or equal to the first sequence number of the first protocol layer of the data packet sent by the first access network device, the second access network device sends the third indication information to the first access network device.

Optionally, in response to the second sequence number of the first protocol layer of the data packet that is being sent by the second access network device to the first terminal device being N, and the first sequence number of the first protocol layer of the data packet sent by the first access network device is N−1, the second access network device sends the third indication information to the first access network device.

Figure 6:
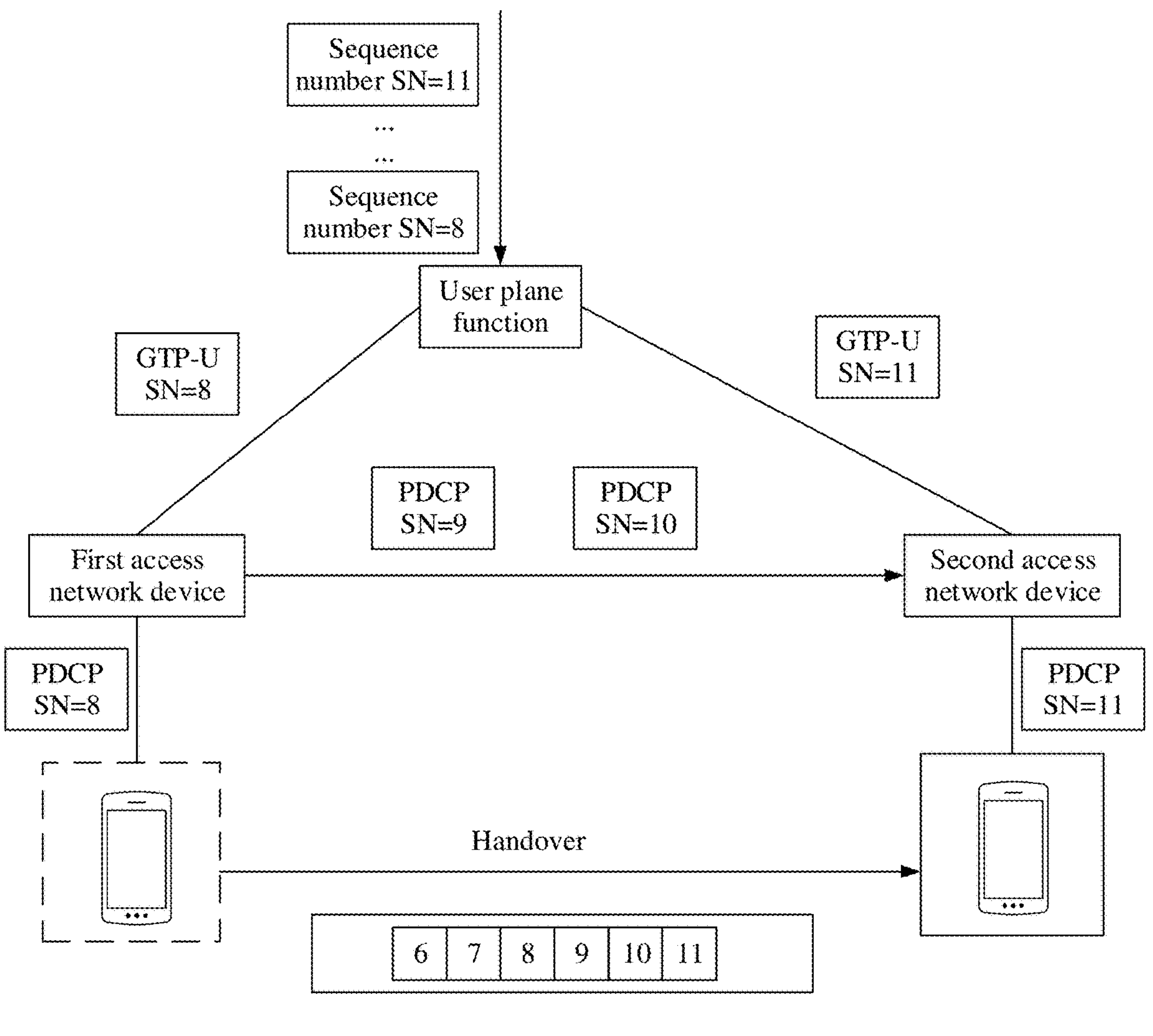
FIG. 6 is a schematic flowchart of data forwarding in a communication method according to some embodiments disclosed herein.

Specifically, after the terminal device is successfully handed over, the second access network device starts to send a data packet of the first service to the terminal device, and the first access network device forwards, to the second access network device, a data packet that is of the first service and that is not successfully received by the terminal from the first access network device. In response to a sequence number of the data packet received by the second access network device from the first access network device being greater than or equal to a sequence number of the data packet sent to the terminal device, the second access network device indicates to stop data forwarding. For the first service, it is assumed that sending progress of the second access network device is fast. FIG. 6 is a schematic flowchart of the data forwarding of the communication method according to some embodiments disclosed herein. A user plane function receives data packets of a first service that are sent by a data server. In response to the data server sending the data packets of the first service, the data server includes indication information such as service sequence numbers in the data packets. The user plane function separately sends the received data packets of the first service to the first access network device and the second access network device. However, progress of sending the data packets by the user plane function to the first access network device and the second access network device is inconsistent. A largest sequence number of data packets of the first service that have been sent by the first access network device is SN=8, and a largest sequence number of data packets of the first service that have been sent by the second access network device is SN=11. In some embodiments disclosed herein, after the first terminal device is handed over to the second access network device, in response to the first terminal device receiving the first service based on the sending progress of the second access network device, data packets whose SNs are 9 and 10 are lost. Therefore, the first access network device forwards the data packets whose SNs are 9 and 10 to the second access network device. In response to progress of the data packets forwarded by the first access network device catching up with the sending progress of the second access network device, that is, in response to a sequence number of a data packet received by the second access network device from the first access network device being greater than or equal to an SN of the $1^{st}$ data packet that is of the first service and that is sent by the second access network device after the terminal device is successfully handed over to the second access network device, the second access network device sends stop indication information to the first access network device, to indicate that the data forwarding ends.

In an optional implementation, the third indication information includes identification information of the first service.

S504: The first access network device receives the third indication information from the second access network device.

S505: The first access network device stops, based on the third indication information, forwarding the data packet to the second access network device.

Specifically, after receiving the indication information, the first access network device stops the data forwarding. The first access network device keeps performing data forwarding before receiving the stop indication information of the target base station.

Therefore, in the handover process of the first terminal device, the second access network device determines whether the data forwarding of the first access network device is stopped, and sends the data forwarding stop indication information to the first access network device, so that multicast service receiving continuity of the terminal device in the handover process is ensured, and a packet loss or redundant transmission is avoided.

Optionally, before step S501, the method 500 includes the following steps.

The second access network device receives status report information that is of a data packet and that is sent by the first terminal device, where the status report information of the data packet indicates, to the second access network device, a data packet that is of the first service and that has been successfully received by the first terminal device and a data packet that has not been successfully received by the first terminal device.

The second access network device sends fourth indication information to the first access network device based on the status report information, where the fourth indication information indicates a sequence number of the $1^{st}$ data packet forwarded by the first access network device to the second access network device, and the first data packet is a data packet that the first access network device starts to forward to the second access network device or a data packet with a smallest sequence number in all forwarded data packets in a data forwarding process.

The first access network device receives the fourth indication information sent by the second access network device.

The first access network device forwards a data packet to the second access network device based on the fourth indication information.

Specifically, the first terminal device sends the status report information of the data packet to the second access network device after the handover, where the status report information indicates, to the second access network device, data packets successfully received by the first terminal device and data packets unsuccessfully received by the first terminal device. After receiving the status report information, the second access network device sends the fourth indication information to the first access network device, where the fourth indication information indicates a sequence number of a first protocol layer of the $1^{st}$ data packet that is not received by the first terminal device, namely, a start data packet in data forwarding by the first access network device. In this way, the first terminal device can be prevented from receiving a redundant data packet. To be specific, the following case can be avoided: A data packet sent by the first access network device is successfully received by the first terminal device, but is still forwarded by the first access network device to the second access network device, and then sent by the second access network device to the first terminal device.

Figure 7:
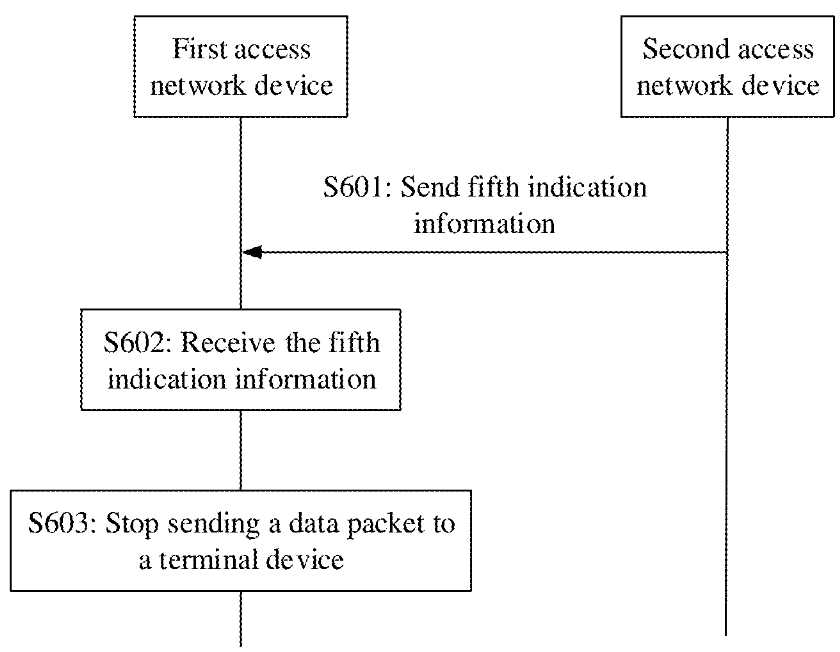
FIG. 7 is a schematic flowchart of a communication method according to some embodiments disclosed herein.

Some embodiments disclosed herein provide a communication method 600. The following describes in detail, with reference to FIG. 7, a communication method provided in some embodiments. FIG. 7 is a schematic flowchart of the communication method 600 according to some embodiments disclosed herein. The method 600 is applied to the scenario shown in FIG. 1, or certainly is applied to another communication scenario. This is not limited in this embodiment. In the method 600, in a process in which a first terminal device connected to a first access network device is handed over from the first access network device to a second access network device, the terminal device keeps connected to both the first access network device and the second access network device. In this way, the first access network device and the second access network device simultaneously send first services to the terminal device. The first access network device continues to send a data packet that is not successfully received by the terminal device before the handover. In addition, the terminal device receives a data packet of the first service from the second access network device. In response to a sequence number of the data packet received from the first access network device being consecutive to a sequence number of the data packet received from the second access network device (where for example, a data packet with a largest SN 9 is received from the first access network device, and a data packet with a smallest SN 10 is received from the second access network device), the first access network device stops sending a data packet to the terminal device, and disconnects from the terminal device.

In some embodiments, the method is described by using an example in which the terminal device and the access network devices perform the method. By way of example but not limitation, the method is alternatively performed by chips, chip systems, processors, or the like used in the terminal device and the access network devices.

As shown in FIG. 7, the method 600 shown in FIG. 7 includes S601 to S603. The following describes in detail the steps in the method 600 with reference to FIG. 7.

S601: The second access network device sends fifth indication information to the first access network device, where the fifth indication information includes a first sequence number N, and the first sequence number indicates a sequence number of the $1^{st}$ data packet that is of the first service and that is sent by the second access network device to the first terminal device after the first terminal device is successfully handed over from the first access network device to the second access network device.

S602: The first access network device receives the fifth indication information sent by the second access network device.

S603: In response to a sequence number of a data packet successfully sent by the first access network device to the terminal device being N−1, the first access network device stops sending a data packet to the terminal device.

Therefore, in a handover process, the first access network device determines, based on the SN indicated by the second access network device, when to stop a connection to the terminal device, so that multicast service receiving continuity of the terminal device in the handover process is ensured, and a packet loss or redundant transmission is avoided.

Specifically, in the handover process, the first terminal device receives data packets of the first services from both the first access network device and the second access network device. The first access network device does not forward the data packet of the first service to the second access network device. That is, a data forwarding process is not used. For example, in FIG. 5, data forwarding is not performed on the data packets whose SNs are 9 and 10, and the data packets are directly sent to the first terminal device by the first access network device. After the first terminal device is successfully handed over to the second access network device, the second access network device sends, to the first access network device, the SN (for example, 11) of the $1^{st}$ data packet that is of the first service and that is sent to the terminal device. The first access network device determines, based on the SN of the $1^{st}$ data packet, when to stop sending data to the first terminal device. In response to the sequence number of a first protocol layer of the data packet successfully sent by the first access network device to the terminal device being N−1, the first access network device stops sending the data packet to the first terminal device. For example, in FIG. 5, after sending the data packet with number 11−1=10, the first access network device disconnects from the first terminal device.

Optionally, the first access network device sends stop indication information to the second access network device, to indicate the first access network device to disconnect from the first terminal device.

Optionally, in response to the terminal device being successfully handed over to the second access network device, the second access network device sends, to the first access network device, information indicating that the first terminal device is successfully handed over. After the first access network device receives the information indicating that the first terminal device is successfully handed over, the first access network device sends, to the second access network device, a first sequence number of a first protocol layer newly sent to the first terminal device, the second access network device determines, based on the first sequence number of the first protocol layer and a second sequence number of the first protocol layer, whether the first access network device stops sending the data packet of the first service to the first terminal device, where the second sequence number of the first protocol layer is a sequence number of a first protocol layer of the $1^{st}$ data packet received by the first terminal device from the second access network device after the first terminal device is handed over from the first access network device to the second access network device. In response to the first sequence number of the first protocol layer being greater than the second sequence number of the first protocol layer, the second access network device sends indication information to the first access network device, to indicate the first access network device to disconnect from the first terminal device.

Optionally, the second access network device sends fifth indication information to the first access network device. The fifth indication information includes a first sequence number N−1, and the first sequence number indicates the first access network device to stop, in response to the sequence number of the first protocol layer of the data packet successfully sent by the first access network device to the terminal device being N−1, sending the data packet to the terminal device.

Therefore, the first access network device no longer performs calculation, and directly stops sending the data packet after a data packet whose first sequence number is N−1 is sent.

The foregoing describes in detail, with reference to FIG. 1 to FIG. 7, the methods for measuring a communication parameter of a multi-SIM terminal device according to embodiments disclosed herein. The following describes in detail communication apparatus in embodiments disclosed herein with reference to FIG. 8 to FIG. 10.

Figure 8:
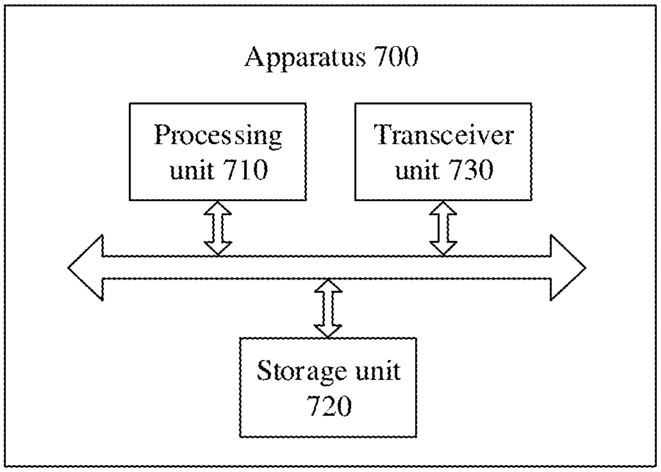
FIG. 8 is a schematic block diagram of a communication apparatus according to some embodiments disclosed herein.

FIG. 8 is a schematic block diagram of a communication apparatus 700 according to some embodiments disclosed herein.

In some embodiments, the apparatus 700 is a terminal device, or is a chip or a circuit, for example, a chip or a circuit that is disposed in the terminal device.

In some embodiments, the apparatus 700 is an access network device, or is a chip or a circuit, for example, a chip or a circuit that is disposed in the access network device.

In some embodiments, the apparatus 700 is a core network device, or is a chip or a circuit, for example, a chip or a circuit that is disposed in the core network device.

In some embodiments, the apparatus 700 includes a processing unit 710 (that is, an example of a processor) and a transceiver unit 730. In some embodiments, the processing unit 710 is also referred to as a determining unit. In some embodiments, the transceiver unit 730 includes a receiving unit and a sending unit.

In some embodiments, the transceiver unit 730 is implemented by using a transceiver, a transceiver-related circuit, or an interface circuit.

In some embodiments, the apparatus further includes a storage unit 720. In a some embodiments, the storage unit 720 is configured to store instructions. In an embodiment, the storage unit is alternatively configured to store data or information. The storage unit 720 is implemented by using a memory.

In some embodiments, the processing unit 710 is configured to execute the instructions stored in the storage unit 720, so that the apparatus 700 implements the steps performed by the terminal device in the foregoing methods. Alternatively, the processing unit 710 is configured to invoke the data in the storage unit 720, so that the apparatus 700 implements the steps performed by the terminal device in the foregoing methods.

In some embodiments, the processing unit 710 is configured to execute the instructions stored in the storage unit 720, so that the apparatus 700 implements the steps performed by the access network device in the foregoing methods. Alternatively, the processing unit 710 is configured to invoke the data in the storage unit 720, so that the apparatus 700 implements the steps performed by the access network device in the foregoing methods.

For example, the processing unit 710, the storage unit 720, and the transceiver unit 730 communicate with each other by using an internal connection path to transfer a control signal and/or a data signal. For example, the storage unit 720 is configured to store a computer program, and the processing unit 710 is configured to invoke the computer program from the storage unit 720 and run the computer program, to control the transceiver unit 730 to receive a signal and/or send a signal, to complete the steps of the terminal device or the access network device in the foregoing methods. The storage unit 720 is integrated into the processing unit 710, or is disposed separately from the processing unit 710.

Optionally, in response to the apparatus 700 being a communication device (for example, the terminal device or the access network device), the transceiver unit 730 includes a receiver and a transmitter. The receiver and the transmitter is a same physical entity or different physical entities. In response to the receiver and the transmitter being the same physical entity, the receiver and the transmitter are collectively referred to as a transceiver.

In response to the apparatus 700 being the terminal device or the apparatus is the access network device or the core network device, the transceiver unit 730 is a sending unit or a transmitter when sending information, and the transceiver unit 730 is a receiving unit or a receiver when receiving information. The transceiver unit is a transceiver. The transceiver, the transmitter, or the receiver is a radio frequency circuit. In response to the apparatus including the storage unit, the storage unit is configured to store computer instructions. The processor is communicatively connected to the memory. The processor executes the computer instructions stored in the memory, so that the apparatus can perform the method 200, the method 500, or the method 600. The processor is a general-purpose central processing unit (CPU), a microprocessor, or an application specific integrated circuit (Application Specific Integrated Circuit, ASIC).

Optionally, in response to the apparatus 700 being the chip or the circuit, the transceiver unit 730 includes an input interface and an output interface.

In response to the apparatus 700 being the chip, the transceiver unit 730 is the input interface and/or the output interface, a pin, a circuit, or the like. The processing unit 710 executes computer-executable instructions stored in the storage unit, so that the apparatus can perform the method 200, the method 500, or the method 600. Optionally, the storage unit is a storage unit in the chip, for example, a register or a buffer, or the storage unit is a storage unit in the terminal but outside the chip, for example, a read-only memory (Read Only Memory, ROM), another type of static storage device capable of storing static information and instructions, or a random access memory (Random Access Memory, RAM).

In an embodiment, It is considered that a function of the transceiver unit 730 is implemented by using a transceiver circuit or a transceiver-dedicated chip. It is considered that the processing unit 710 is implemented by using a dedicated processing chip, a processing circuit, a processing unit, or a general-purpose chip.

In another embodiment, it is considered that the communication device (for example, the terminal device or the access network device) provided in some embodiments disclosed herein is implemented by using a general-purpose computer. That is, program code for implementing functions of the processing unit 710 and the transceiver unit 730 is stored in the storage unit 720, and a general-purpose processing unit implements the functions of the processing unit 710 and the transceiver unit 730 by executing the code in the storage unit 720.

In some embodiments, the apparatus 700 is an access network device, where the access network device is a first access network device; or is a chip or a circuit disposed in the first access network device. In response to the apparatus 700 being the first access network device or the chip or the circuit disposed in the first access network device, the transceiver unit 730 is configured to receive a first data packet and first indication information from a core network device, where the first indication information indicates a sequence of the first data packet in at least one data packet; the processing unit 710 is configured to determine a first sequence number of a first protocol layer of the first data packet based on the first indication information; and the transceiver unit 730 is configured to send the first data packet to a terminal device.

In an embodiment, the first indication information includes at least one of the following information: a general packet radio service tunneling protocol-user plane GTP-U sequence number and a first service sequence number, where the first service sequence number is set by the core network device or a data server, the first data packet is a data packet of a first service, and the at least one data packet is a data packet of the first service.

In an embodiment, the first protocol layer includes at least one of the following: a service data adaptation protocol SDAP layer, a packet data convergence protocol PDCP layer, and a radio link control layer RLC layer.

In an embodiment, the processing unit 710 is further configured to determine a start sequence number of the first protocol layer of the first data packet based on the first indication information in response to any one of establishment of a first protocol entity, re-establishment of the first protocol entity, and recovery of the first protocol entity occurs.

In an embodiment, the transceiver unit 730 is further configured to send second indication information to the terminal device, where the second indication information indicates a sequence number of the $1^{st}$ data packet that is of the first service and that is sent by the first access network device to the terminal device after the first protocol entity is established, the first protocol entity is re-established, or the first protocol entity is recovered.

In an embodiment, the transceiver unit 730 is further configured to receive third indication information from a second access network device, where the third indication information indicates the first access network device to stop forwarding a data packet to the second access network device. The processing unit 710 is configured to stop, based on the third indication information, forwarding the data packet to the second access network device.

In an embodiment, the transceiver unit 307 is further configured to receive fourth indication information sent by the second access network device, where the fourth indication information indicates a sequence number of the $1^{st}$ data packet forwarded by the first access network device to the second access network device. The processing unit 710 is configured to forward a data packet to the second access network device based on the fourth indication information.

In an embodiment, the transceiver unit 730 is further configured to receive fifth indication information sent by a second access network device, where the fifth indication information includes a first sequence number N, the fifth indication information includes a second sequence number N, and the second sequence number indicates a sequence number of the $1^{st}$ data packet that is of the first service and that is sent by the second access network device to the terminal device after handover of the terminal device is completed. The processing unit 710 is configured to determine to stop, in response to a sequence number that is of a protocol layer and that corresponds to a data packet successfully sent by the first access network device to the terminal device being N−1, sending a data packet to the terminal device.

In response to the apparatus 700 being configured in the first access network device or is the first access network device, the modules or the units in the apparatus 700 is configured to perform the actions or the processing processes performed by the first access network device in the foregoing methods. To avoid repetition, detailed descriptions are omitted herein.

In some embodiments, the apparatus 700 is a terminal device, or a chip or a circuit disposed in the terminal device. In response to the apparatus 700 being the terminal device, or the chip or the circuit disposed in the terminal device, the transceiver unit 730 is configured to receive second indication information sent by a first access network device, where the second indication information indicates a sequence number of the $1^{st}$ data packet that is of a first service and that is sent by the first access network device to the terminal device after a first protocol entity is established, the first protocol entity is re-established, or the first protocol entity is recovered.

In an embodiment, the transceiver unit 730 is further configured to: in response to the first protocol entity being re-established or recovered, send request information to the first access network device, where the request information requests the first access network device to send the sequence number of the $1^{st}$ data packet that is of the first service and that is sent by the first access network device to the terminal device after the first protocol entity is re-established or the first protocol entity is recovered.

In an embodiment, the transceiver unit 730 is further configured to send status report information of a data packet to a second access network device, where the status report information of the data packet indicates, to the second access network device, a data packet successfully received by the terminal device and a data packet unsuccessfully received by the terminal device, where the terminal device is handed over from the first access network device to the second access network device.

In response to the apparatus 700 being configured in the terminal device or being the terminal device, the modules or the units in the apparatus 700 are configured to perform the actions or the processing processes performed by the first terminal device in the foregoing methods. To avoid repetition, detailed descriptions are omitted herein.

In some embodiments, the apparatus 700 is an access network device, where the access network device is a first access network device; or is a chip or a circuit disposed in the first access network device. In response to the apparatus 700 being the first access network device or the chip or the circuit disposed in the first access network device, the transceiver unit 730 is configured to receive a first data packet and first indication information from a core network device, where the first indication information indicates a sequence of the first data packet in at least one data packet; the processing unit 710 is configured to determine a first sequence number of a first protocol layer of the first data packet based on the first indication information; and the transceiver unit 730 is configured to send the first data packet to a terminal device.

In an embodiment, the first indication information includes at least one of the following information: a general packet radio service tunneling protocol-user plane GTP-U sequence number and a first service sequence number, where the first service sequence number is set by the core network device or a data server, the first data packet is a data packet of a first service, and the at least one data packet is a data packet of the first service.

In an embodiment, the first protocol layer includes at least one of the following: a service data adaptation protocol SDAP layer, a packet data convergence protocol PDCP layer, and a radio link control layer RLC layer.

In an embodiment, the processing unit 710 is further configured to determine a start sequence number of the first protocol layer of the first data packet based on the first indication information in response to any one of establishment of a first protocol entity, re-establishment of the first protocol entity, and recovery of the first protocol entity occurs.

In an embodiment, the transceiver unit 730 is further configured to send second indication information to the terminal device, where the second indication information indicates a sequence number of the 1$^{st}$ data packet that is of the first service and that is sent by a first access network device to the terminal device after the first protocol entity is established, the first protocol entity is re-established, or the first protocol entity is recovered.

In an embodiment, the transceiver unit 730 is further configured to: receive a data packet sent by a first access network device, where a second terminal device connected to the first access network device is handed over from the first access network device to the second access network device, both the first terminal device and the second terminal device perform the first service, and the data packet sent by the first access network device is a data packet of the first service; and send third indication information to the first access network device in response to a second sequence number of a first protocol layer of a data packet being sent to the first terminal device is greater than or equal to a first sequence number of a first protocol layer of the data packet that is sent by the first access network device, where the third indication information indicates the first access network device to stop forwarding a data packet to the second access network device.

In an embodiment, the transceiver unit 730 is further configured to: receive status report information that is of a data packet and that is sent by the second terminal device, where the status report information of the data packet indicates, to the second access network device, a data packet successfully received by the terminal device and a data packet unsuccessfully received by the terminal device; and send fourth indication information to the first access network device based on the status report information, where the fourth indication information indicates a sequence number of the 1$^{st}$ data packet forwarded by the first access network device to the second access network device.

In an embodiment, the transceiver unit 730 is further configured to send fifth indication information to a first access network device, where the fifth indication information includes a second sequence number N, and the second sequence number indicates a sequence number of the 1$^{st}$ data packet that is of the first service and that is sent by the second access network device to a second terminal device after handover of the second terminal device is completed.

In response to the apparatus 700 being configured in the second access network device or is the second access network device, the modules or the units in the apparatus 700 are configured to perform the actions or the processing processes performed by the second access network device in the foregoing methods. To avoid repetition, detailed descriptions are omitted herein.

In some embodiments, the apparatus 700 is a core network device, or a chip or a circuit disposed in the core network device. In response to the apparatus 700 being the core network device, or the chip or the circuit disposed in the core network device, the transceiver unit 730 is configured to receive a first packet sent by a data server; the transceiver unit 730 is configured to send a second data packet and first indication information to a first access network device, where the first indication information indicates a sequence of the second data packet in at least one data packet sent by the core network device; and the transceiver unit 730 is configured to send a third data packet and second indication information to a second access network device, where the first indication information indicates a sequence of the third data packet in the at least one data packet sent by the core network device, where data in the second data packet and data in the third data packet are the same as data in the first data packet.

In an embodiment, the first indication information includes at least one of the following information: a general packet radio service tunneling protocol-user plane GTP-U sequence number and a first service sequence number, where the first service sequence number is set by the core network device or the data server, the first data packet is a data packet of a first service, and the at least one data packet is a data packet of the first service.

In response to the apparatus 700 being configured in the core network device or is the core network device, the modules or the units in the apparatus 700 is configured to perform the actions or the processing processes performed by the core network device in the foregoing methods. To avoid repetition, detailed descriptions are omitted herein.

For concepts, explanations, detailed descriptions, and other steps of the apparatus 700 that are related to the technical solutions provided in embodiments disclosed herein, refer to the descriptions of the content in the foregoing methods or other embodiments. Details are not described herein again.

Figure 9:
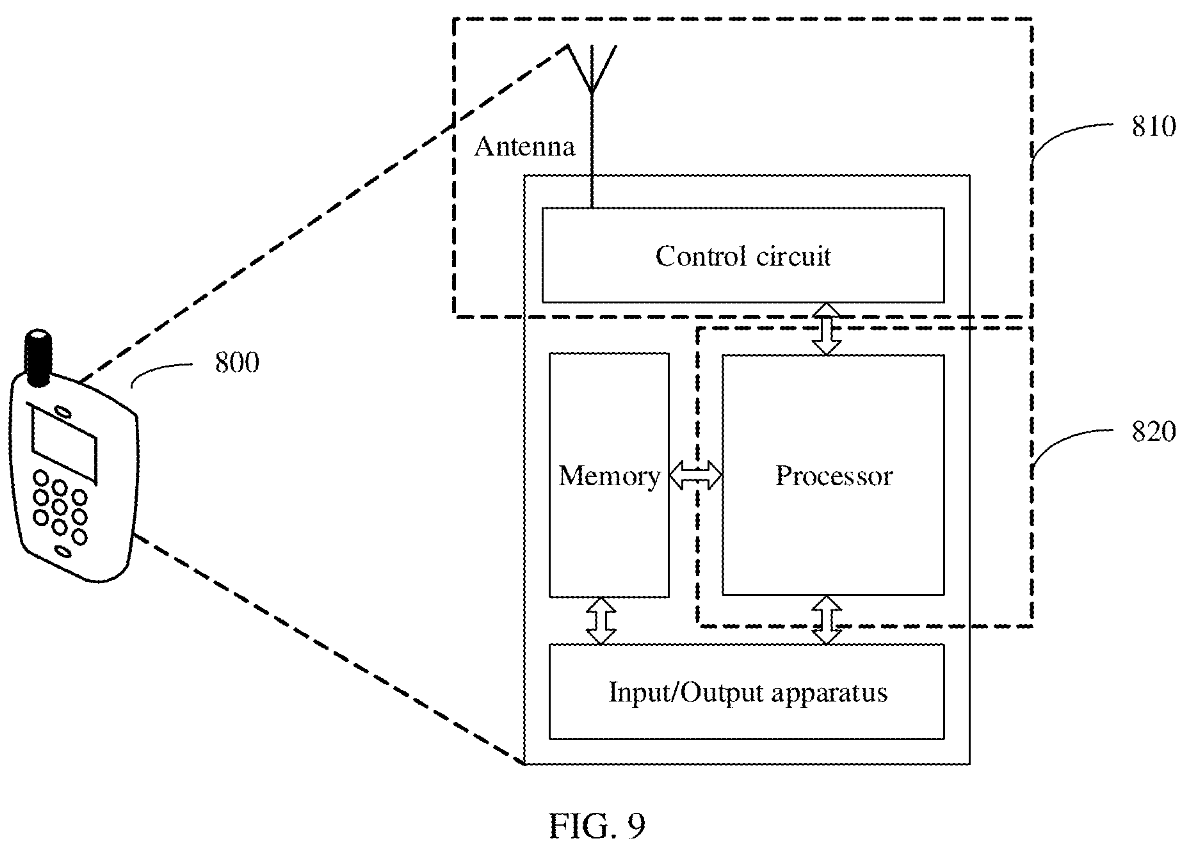
FIG. 9 is a schematic diagram of a structure of a terminal device according to some embodiments disclosed herein.

FIG. 9 is a schematic diagram of a structure of a terminal device 800 according to embodiments disclosed herein. The terminal device 800 performs the actions performed by the terminal device in the foregoing method embodiments.

For ease of description, FIG. 9 shows only main components of the terminal device. As shown in FIG. 9, the terminal device 800 includes a processor, a memory, a control circuit, an antenna, and an input/output apparatus.

The processor is configured to process a communication protocol and communication data, control the entire terminal device, execute a software program, and process data of the software program, for example, configured to support the terminal device in performing actions described in the foregoing embodiments of the transmission precoding matrix indication methods. The memory is configured to store the software program and the data, for example, store the codebook described in the foregoing embodiments. The control circuit is configured to convert a baseband signal and a radio frequency signal and process the radio frequency signal. A combination of the control circuit and the antenna is referred to as a transceiver that is configured to send and receive a radio frequency signal in an electromagnetic wave form. The input/output apparatus, for example, a touchscreen, a display, or a keyboard, is configured to: receive data input by a user and output data to the user.

After the terminal device is powered on, the processor reads the software program in the storage unit, interpret and execute instructions of the software program, and process the data of the software program. In response to data being sent wirelessly, the processor performs baseband processing on the to-be-sent data, and then outputs a baseband signal to a radio frequency circuit. The radio frequency circuit performs radio frequency processing on the baseband signal, and then sends, through the antenna, a radio frequency signal in an electromagnetic wave form. In response to data being sent to the terminal device, the radio frequency circuit receives a radio frequency signal through the antenna, converts the radio frequency signal into a baseband signal, and outputs the baseband signal to the processor. The processor converts the baseband signal into data and processes the data.

Persons skilled in the art understands that, for ease of description, FIG. 9 shows only one memory and only one processor. In an actual terminal device, there are a plurality of processors and memories. The memory is also referred to as a storage medium, a storage device, or the like. This is not limited in embodiments disclosed herein.

For example, the processor includes a baseband processor and a central processing unit. The baseband processor is configured to process the communication protocol and the communication data. The central processing unit is configured to: control the entire terminal device, execute the software program, and process the data of the software program. Functions of the baseband processor and the central processing unit are integrated into the processor in FIG. 9. Persons skilled in the art understand that the baseband processor and the central processing unit each are an independent processor, and are interconnected by using technologies such as a bus. Persons skilled in the art understand that the terminal device includes a plurality of baseband processors to adapt to different network standards, the terminal device includes a plurality of central processing units to enhance processing capabilities of the terminal device, and components of the terminal device are connected by using various buses. The baseband processor is alternatively expressed as a baseband processing circuit or a baseband processing chip. The central processing unit is alternatively expressed as a central processing circuit or a central processing chip. A function of processing the communication protocol and the communication data is embedded in the processor, or is stored in the storage unit in a form of the software program. The processor executes the software program to implement a baseband processing function.

For example, in some embodiments disclosed herein, the antenna and the control circuit that have receiving and sending functions is considered as a transceiver unit 810 of the terminal device 800, and the processor having a processing function is considered as a processing unit 820 of the terminal device 800. As shown in FIG. 9, the terminal device 800 includes the transceiver unit 810 and the processing unit 820. The transceiver unit is also referred to as a transceiver, a transceiver, a transceiver apparatus, or the like. Optionally, a component that is in the transceiver unit 810 and that is configured to implement a receiving function considered as a receiving unit, and a component that is in the transceiver unit 810 and that is configured to implement a sending function considered as a sending unit. That is, the transceiver unit includes the receiving unit and the sending unit. For example, the receiving unit is also referred to as a receiver, a receiver, or a receiving circuit, and the sending unit is also referred to as a transmitter, a transmitter, or a transmitting circuit.

Figure 10:
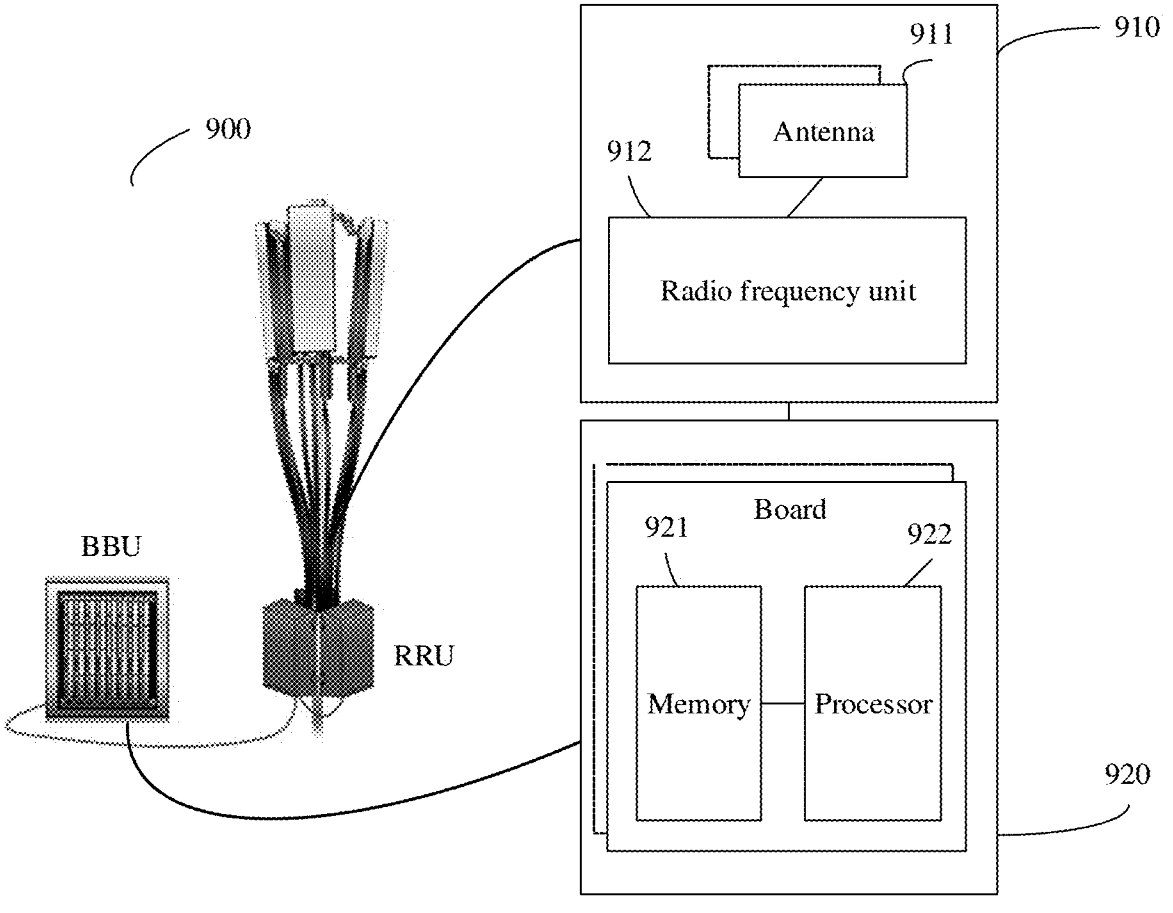
FIG. 10 is a schematic diagram of a structure of an access network device according to some embodiments disclosed herein.

FIG. 10 is a schematic diagram of a structure of an access network device 900 according to some embodiments disclosed herein. The access network device 900 is configured to implement functions of the access device (for example, the first access network device, the second access network device, or a third access network device) in the foregoing methods. The access network device 900 includes one or more radio frequency units such as a remote radio unit (remote radio unit, RRU) 910 and one or more baseband units (baseband unit, BBU) (which is also referred to as a digital unit, digital unit, DU) 920. The RRU 910 is referred to as a transceiver unit, a transceiver, a transceiver circuit, a transceiver, or the like, and includes at least one antenna 911 and a radio frequency unit 912. The RRU 910 is configured to send and receive a radio frequency signal, and perform conversion between a radio frequency signal and a baseband signal, for example, is configured to send the signaling messages in the foregoing embodiments to a terminal device. The BBU 920 is configured to: perform baseband processing, control a base station, and the like. The RRU 910 and the BBU 920 are physically disposed together, or are physically separated, that is, in a distributed base station.

The BBU 920 is a control center of the base station, and is also referred to as a processing unit, configured to implement a baseband processing function such as channel encoding, multiplexing, modulation, or spreading. For example, the BBU (the processing unit) 920 is configured to control the base station 40 to perform an operation procedure related to the network device in the foregoing method embodiments.

In an example, the BBU 920 includes one or more boards, and a plurality of boards that jointly support a radio access network (for example, an LTE system or a 5G system) of a single access standard, or separately support radio access networks of different access standards. The BBU 920 further includes a memory 921 and a processor 922. The memory 921 is configured to store necessary instructions and data. For example, the memory 921 stores the codebook and the like in the foregoing embodiments. The processor 922 is configured to control the base station to perform a necessary action, for example, configured to control the base station to perform the operation procedure related to the network device in the foregoing method embodiments. The memory 921 and the processor 922 serve one or more boards. In other words, the memory and the processor are separately disposed on each board. Alternatively, a plurality of boards share a same memory and a same processor. In addition, a necessary circuit is further disposed on each board.

In an embodiment, with development of a system-on-chip (system-on-chip, SoC) technology, all or some functions of the parts 920 and 910 are implemented by using the SoC technology, for example, implemented by using one base station function chip. The base station function chip integrates components such as a processor, a memory, and an antenna port. A program of a base station-related function is stored in the memory, and the processor executes the program to implement the base station-related function. Optionally, the base station function chip can also read an external memory of the chip, to implement the base station-related function.

The structure of the access network device shown in FIG. 10 is an embodiment, and does not constitute any limitation on embodiments disclosed herein. The embodiments disclosed herein do not exclude a possibility that a base station structure of another form appears in the future.

The processor in embodiments disclosed herein is a central processing unit (central processing unit, CPU). The processor is alternatively another general-purpose processor, a digital signal processor (digital signal processor, DSP), an application specific integrated circuit (application specific integrated circuit, ASIC), a field programmable gate array (field programmable gate array, FPGA) or another programmable logic device, a discrete gate or a transistor logic device, a discrete hardware component, or the like. The general-purpose processor is a microprocessor, or the processor is any conventional processor or the like.

The memory in embodiments disclosed herein is a volatile memory or a nonvolatile memory, or includes a volatile memory and a nonvolatile memory. The nonvolatile memory is a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory is a random access memory (random access memory, RAM), used as an external cache. By way of example but not limitative description, random access memories (random access memory, RAM) in many forms is used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments are implemented by using software, hardware, firmware, or any combination thereof. In response to software being used for implementing embodiments, the foregoing embodiments are implemented completely or partially in a form of a computer program product. The computer program product includes one or more computer instructions or computer programs. In response to the computer instructions or the computer programs being loaded and executed on the computer, the procedure or functions according to embodiments disclosed herein are all or partially generated. The computer is a general-purpose computer, a dedicated computer, a computer network, or other programmable apparatuses. The computer instructions are stored in a computer-readable storage medium or are transmitted from a computer-readable storage medium to another computer-readable storage medium. For example, the computer instructions are transmitted from a website, computer, server, or data center to another website, computer, server, or data center in a wired (for example, infrared, radio, or microwave) embodiment. The computer-readable storage medium is any usable medium accessible by a computer, or a data storage device, such as a server or a data center, integrating one or more usable media. The usable medium is a magnetic medium (for example, a floppy disk, a hard disk, or a magnetic tape), an optical medium (for example, a DVD), or a semiconductor medium. The semiconductor medium is a solid-state drive.

Some embodiments disclosed herein further provide a computer-readable medium. The computer-readable medium stores a computer program. In response to the computer program being executed by a computer, the steps performed by the terminal device, the steps performed by the first access network device, the steps performed by the second access network device, or the steps performed by the core network device in any one of the foregoing embodiments are implemented.

Some embodiments disclosed herein further provide a computer program product. In response to the computer program product being executed by a computer, the steps performed by the terminal device, the steps performed by the first access network device, the steps performed by the second access network device, or the steps performed by the core network device in any one of the foregoing embodiments are implemented.

Some embodiments disclosed herein further provide a system on chip. The system on chip includes a communication unit and a processing unit. The processing unit is, for example, a processor. The communication unit is, for example, a communication interface, an input/output interface, a pin, a circuit, or the like. The processing unit executes computer instructions, so that a chip in a communication apparatus performs the steps performed by the terminal device, the steps performed by the first access network device, the steps performed by the second access network device, the steps performed by the core network device provided in the foregoing embodiments disclosed herein.

Optionally, the computer instructions are stored in a storage unit.

According to the methods provided in embodiments disclosed herein, some embodiments further provide a communication system, including the foregoing first access network device, the foregoing second access network device, the foregoing core network device, and the foregoing terminal device.

Embodiments disclosed herein are used independently, or are used jointly. This is not limited herein.

In addition, aspects or features of embodiments disclosed herein are implemented as a method, an apparatus, or a product that uses standard programming and/or engineering technologies. The term "product" used herein covers a computer program that can be accessed from any computer-readable component, carrier, or medium. For example, the computer-readable medium includes but is not limited to: a magnetic storage component (for example, a hard disk, a floppy disk, or a magnetic tape), an optical disc (for example, a compact disc (compact disc, CD) and a digital versatile disc (digital versatile disc, DVD)), a smart card, and a flash memory component (for example, an erasable programmable read-only memory (erasable programmable read-only memory, EPROM), a card, a stick, or a key drive). In addition, various storage media described in some embodiments disclosed herein indicate one or more devices and/or other machine-readable media that are configured to store information. The term "machine-readable media" includes but is not limited to a radio channel and various other media that can store, include, and/or carry instructions and/or data.

The term "and/or" describes an association relationship between associated objects, and represents that three relationships exist. For example, A and/or B represent the following three cases: Only A exists, both A and B exist, and only B exists. The character "/" generally indicates an "or" relationship between the associated objects. "At least one" means one or more. "At least one of A and B", similar to "A and/or B", describes an association relationship between associated objects, and represents that three relationships exist. For example, at least one of A and B represents the following three cases: Only A exists, both A and B exist, and only B exists.

Persons of ordinary skill in the art are be aware that, in combination with the examples described in embodiments disclosed in some embodiments disclosed herein, units and algorithm steps can be implemented by electronic hardware or a combination of computer software and the electronic hardware. Whether the functions are performed by hardware or software depends on particular applications and design constraint conditions of the technical solutions. Persons skilled in the art use different methods to implement the described functions for each particular application, but is not to be considered that the embodiment goes beyond the scope of embodiments disclosed herein.

It is clearly understood by persons skilled in the art that, for the purpose of convenient and brief description, for a detailed working process of the foregoing system, apparatus, and unit, refer to a corresponding process in the foregoing method embodiments. Details are not described herein again.

In some embodiments disclosed herein, the disclosed system, apparatus, and method are implemented in other embodiments. For example, the foregoing apparatus embodiments are examples. For example, division into the units is logical function division and is other division during actual implementation. For example, a plurality of units or components are combined or integrated into another system, or some features are ignored or not performed. In addition, the displayed or discussed mutual coupling, direct coupling, or communication connection are implemented by using some interfaces. The indirect coupling or communication connection between the apparatuses or units are implemented in electrical, mechanical, or another form.

The units described as separate parts are or are not be physically separate, and parts displayed as units are or are not be physical units, that is, are located in one position, or are distributed on a plurality of network units. Some or all of the units are selected based on actual requirements to achieve the objectives of the solutions of embodiments.

In addition, functional units in embodiments disclosed herein are integrated into one processing unit, or each of the units exist alone physically, or two or more units are integrated into one unit.

In response to the functions being implemented in the form of a software functional unit and sold or used as an independent product, the functions are stored in a computer-readable storage medium. Based on such an understanding, the technical solutions disclosed herein essentially, or the part contributing to the prior art, or some of the technical solutions are implemented in a form of a software product. The computer software product is stored in a storage medium, and includes instructions for instructing a computer device (which is a personal computer, a server, or a network device) to perform all or some of the steps of the methods in embodiments disclosed herein. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are specific embodiments of embodiments disclosed herein, but the protection scope of is not limited thereto. Any variation or replacement readily figured out by persons skilled in the art within the technical scope disclosed in embodiments shall fall within the protection scope of embodiments disclosed. Therefore, the protection scope of embodiments disclosed shall be subject to the protection scope of the claims.

What is claimed is:

1. A communication method comprising:

receiving a first data packet and first core network sequence number, wherein the first core network sequence number is set by a core network device, the first core network sequence number indicates a sequence of the first data packet in at least one data packet;

determining a first sequence number of a first protocol layer of the first data packet based on the first core network sequence number, wherein the first sequence number of the first protocol layer of the first data packet is equal to a value of the first core network sequence number;

sending the first data packet to a terminal device; and sending a handover command to the terminal device, wherein the handover command indicates the terminal device to handover from a first network device to a second network device.

2. The method according to claim 1, wherein the first protocol layer is a packet data convergence protocol (PDCP) layer.

3. The method according to claim 1, wherein the at least one data packet is of a first service, the first service is multicast service.

4. The method according to claim 1, further comprising:

setting the first sequence number of the first protocol layer of the first data packet based on the first core network sequence number when any one of establishment of a first protocol entity, re-establishment of the first protocol entity, and recovery of the first protocol entity occurs.

5. The method according to claim 1, further comprising:

sending a sequence number of a data packet of a first service to the second network device, wherein the sequence number indicates progress information of the first service at the first network device.

6. The method according to claim 1, wherein a second core network sequence number corresponding to a second data packet matches the first core network sequence number, wherein the second data packet is from the core network device to the second network device, and data in the first data packet matches data in the second data packet.

7. The method according to claim 1, wherein the first sequence number of the first protocol layer is usable by the first protocol layer to perform sorting or duplicate detection for the first data packet.

8. The method according to claim 1, further comprising:

receiving fifth indication information from the second network device, wherein the fifth indication information comprises a second sequence number N, and the second sequence number indicates a sequence number of the first data packet that is of the first service and that is sent by the second network device to the terminal device after handover of the terminal device is completed; and when a sequence number of a data packet successfully sent by the first access network device to the terminal device is N−1, stopping, by the first network device, sending a data packet to the terminal device.

9. A communications apparatus, comprising:

one or more processors in communications with a non-transitory memory configured to store program instructions;

wherein, when executed by the one or more processors, the instructions cause the one or more processors to:

receive a first data packet and first core network sequence number, wherein the first core network sequence number is set by a core network device, the first core network sequence number indicates a sequence of the first data packet in at least one data packet;

determine a first sequence number of a first protocol layer of the first data packet based on the first core network sequence number, wherein the first sequence number of the first protocol layer of the first data packet is equal to a value of the first core network sequence number; and send the first data packet to a terminal device; and send a handover command to the terminal device, wherein the handover command indicates the terminal device to handover from a first network device to a second network device.

10. The communications apparatus according to claim 9, wherein the first protocol layer is a packet data convergence protocol (PDCP) layer.

11. The communications apparatus according to claim 9, wherein the at least one data packet is of a first service, the first service is multicast service.

12. The communications apparatus according to claim 9, wherein the instructions further cause the one or more processors to:

set the first sequence number of the first protocol layer of the first data packet based on the first core network sequence number when any one of establishment of a first protocol entity, re-establishment of the first protocol entity, and recovery of the first protocol entity occurs.

13. The communications apparatus according to claim 9, further comprising:

sending a sequence number of a data packet of a first service to the second network device, wherein the sequence number indicates progress information of the first service at the first network device.

14. The communications apparatus according to claim 9, wherein a second core network sequence number corresponding to a second data packet matches the first core network sequence number, wherein the second data packet is from the core network device to the second network device, and data in the first data packet matches data in the second data packet.

15. The communications apparatus according to claim 9, wherein the first sequence number of the first protocol layer is usable by the first protocol layer to perform sorting or duplicate detection for the first data packet.

16. The communications apparatus according to claim 9, wherein the instructions further cause the one or more processors to:

receive fifth indication information from a second network device, wherein the fifth indication information comprises a second sequence number N, and the second sequence number indicates a sequence number of the first data packet that is of the first service and that is sent by the second network device to the terminal device after handover of the terminal device is completed; and when a sequence number of a data packet successfully sent by the first access network device to the terminal device is N−1, stopping, by the first network device, sending a data packet to the terminal device.

17. A communication method comprising:

receiving at least one data packet;

sending a first data packet and first core network sequence number to a first access network device, wherein the first core network sequence number indicates a sequence of the first data packet in the at least one data packet, wherein the first core network sequence number is for determining a first sequence number of a first protocol layer of the first data packet, and the first sequence number of the first protocol layer of the first data packet is determined equal to a value of the first core network sequence number.

18. The method according to claim 17, further comprising:

sending a second data packet, a second indication information, and second core network sequence number to a second access network device, wherein the second indication information indicates a sequence of the second data packet in the at least one data packet, the second core network sequence number is for determining a second sequence number of a first protocol layer of the second data packet, the second sequence number of a first protocol layer of the second data packet is determined equal to the value of the second core network sequence number;

wherein data in the second data packet is the same as data in the first data packet, a value of the first core network sequence number is equal to a value of the second core network sequence number.

19. A communications apparatus, comprising:

one or more processors in communications with a non-transitory memory configured to store program instructions;

wherein, when executed by the one or more processors, the instructions cause the one or more processors to:

receive at least one data packet;

send a first data packet and first core network sequence number to a first access network device, wherein the first core network sequence number indicates a sequence of the first data packet in the at least one data packet, wherein the first core network sequence number is for determining a first sequence number of a first protocol layer of the first data packet, and the first sequence number of the first protocol layer of the first data packet is determined equal to a value of the first core network sequence number.

20. The communications apparatus according to claim 19, wherein, when executed by the one or more processors, the instructions further cause the one or more processors to:

send a second data packet, a second indication information, and second core network sequence number to a second access network device, wherein the second indication information indicates a sequence of the second data packet in the at least one data packet, the second core network sequence number is for determining a second sequence number of a first protocol layer of the second data packet, the second sequence number of a first protocol layer of the second data packet is determined equal to the value of the second core network sequence number;

wherein data in the second data packet is the same as data in the first data packet, a value of the first core network sequence number is equal to a value of the second core network sequence number.

* * * * *